US012585698B2

(12) United States Patent
An

(10) Patent No.: US 12,585,698 B2
(45) Date of Patent: Mar. 24, 2026

(54) MULTIMEDIA FOCALIZATION

(71) Applicant: OpenTV, Inc., San Francisco, CA (US)

(72) Inventor: Eunsook An, Santa Clara, CA (US)

(73) Assignee: OPENTV, INC., San Francisco, CA (US)

( * ) Notice: Subject to any disclaimer, the term of this patent is extended or adjusted under 35 U.S.C. 154(b) by 214 days.

(21) Appl. No.: 18/119,983

(22) Filed: Mar. 10, 2023

(65) Prior Publication Data

US 2023/0315784 A1 Oct. 5, 2023

Related U.S. Application Data

(63) Continuation of application No. 16/935,539, filed on Jul. 22, 2020, now Pat. No. 11,630,862, which is a continuation of application No. 15/679,673, filed on Aug. 17, 2017, now Pat. No. 10,769,207.

(51) Int. Cl.
| | |
|---|---|
| *G06F 16/732* | (2019.01) |
| *G06F 3/04812* | (2022.01) |
| *G06F 16/432* | (2019.01) |
| *G06F 16/74* | (2019.01) |
| *G06V 40/16* | (2022.01) |

(52) U.S. Cl.
CPC ...... G06F 16/7335 (2019.01); G06F 3/04812 (2013.01); G06F 16/434 (2019.01); G06F 16/743 (2019.01); G06V 40/169 (2022.01); G06V 40/179 (2022.01)

(58) Field of Classification Search
CPC .............. G06F 3/04812; G06F 16/434; G06F 16/7335; G06F 16/743; G06V 40/169; G06V 40/179
See application file for complete search history.

(56) References Cited

U.S. PATENT DOCUMENTS

| | | | |
|---|---|---|---|
| 7,783,135 | B2 | 8/2010 | Gokturk et al. |
| 7,986,372 | B2 | 7/2011 | Ma |
| 8,255,495 | B1 | 8/2012 | Lee |
| 8,595,781 | B2 | 11/2013 | Neumeier et al. |

(Continued)

FOREIGN PATENT DOCUMENTS

| | | |
|---|---|---|
| EP | 3069230 A1 | 5/2015 |
| EP | 3090363 A1 | 7/2015 |

(Continued)

OTHER PUBLICATIONS

International Search Report and Written Opinion of Oct. 18, 2018 for PCT Application No. PCT/US2018/043395, 12 pages.

(Continued)

*Primary Examiner* — Katrina R Fujita
(74) *Attorney, Agent, or Firm* — POLSINELLI LLP

(57) ABSTRACT

Example implementations are directed to methods and systems for individualized multimedia navigation and control including receiving metadata for a piece of digital content, where the metadata comprises a primary image and text that is used to describes the digital content; analyzing the primary image to detect one or more objects; selecting one or more secondary images corresponding to each detected object; and generating a data structure for the digital content comprising the one or more secondary images, where the digital content is described by a preferred secondary image.

19 Claims, 19 Drawing Sheets

830

840

850

860

(56) References Cited

U.S. PATENT DOCUMENTS

| | | | |
|---|---|---|---|
| 8,635,521 | B2 | 1/2014 | Fleishman |
| 8,782,709 | B2 | 7/2014 | Wang |
| 9,253,511 | B2 | 2/2016 | Chen |
| 9,892,324 | B1 | 2/2018 | Pachauri |
| 9,961,386 | B1* | 5/2018 | Thomas ............. G06F 16/4387 |
| 10,248,864 | B2 | 4/2019 | Farre Guiu |
| 10,275,655 | B2* | 4/2019 | Rafati .................... G06V 20/47 |
| 10,353,950 | B2 | 7/2019 | Sharma et al. |
| 10,455,297 | B1 | 10/2019 | Mahyar |
| 10,515,110 | B2 | 12/2019 | Jing et al. |
| 10,628,708 | B2 | 4/2020 | Lin et al. |
| 10,769,207 | B2 | 9/2020 | An |
| 10,956,007 | B2 | 3/2021 | Choi |
| 11,609,946 | B2 | 3/2023 | Xu et al. |
| 11,630,862 | B2 | 4/2023 | An |
| 2004/0226048 | A1* | 11/2004 | Alpert .................. H04N 21/854 348/E7.071 |
| 2005/0160458 | A1 | 7/2005 | Baumgartner |
| 2006/0064716 | A1 | 3/2006 | Sull |
| 2007/0064811 | A1* | 3/2007 | Zador ................ H04N 21/4384 348/E5.003 |
| 2007/0288478 | A1* | 12/2007 | DiMaria .................. G06F 16/44 |
| 2008/0082426 | A1 | 4/2008 | Gokturk et al. |
| 2008/0260255 | A1 | 10/2008 | Fukushima |
| 2008/0298697 | A1* | 12/2008 | Lee ..................... G06F 3/04817 382/243 |
| 2009/0132942 | A1* | 5/2009 | Santoro ................. G06F 16/955 715/765 |
| 2010/0077441 | A1 | 3/2010 | Thomas |
| 2010/0111501 | A1* | 5/2010 | Kashima .............. H04N 23/633 386/212 |
| 2010/0162172 | A1 | 6/2010 | Aroner |
| 2011/0254972 | A1 | 10/2011 | Yaguchi |
| 2012/0020643 | A1* | 1/2012 | Kato ................... H04N 21/4325 386/E5.003 |
| 2012/0054634 | A1 | 3/2012 | Stone |
| 2012/0271825 | A1 | 10/2012 | Garthwaite et al. |
| 2013/0091113 | A1* | 4/2013 | Gras ..................... G06F 16/951 707/706 |
| 2013/0238419 | A1 | 9/2013 | Glick et al. |
| 2013/0326398 | A1* | 12/2013 | Zuverink .............. G06F 3/0488 715/830 |
| 2014/0099034 | A1 | 4/2014 | Rafati |
| 2014/0149936 | A1 | 5/2014 | Wilder |
| 2014/0208268 | A1 | 7/2014 | Jimenez |
| 2014/0255003 | A1 | 9/2014 | Abranson |
| 2014/0258863 | A1 | 9/2014 | Woods |
| 2014/0327806 | A1 | 11/2014 | Jung |
| 2015/0245107 | A1 | 8/2015 | Klappert |
| 2015/0319506 | A1 | 11/2015 | Kansara |
| 2015/0373407 | A1 | 12/2015 | Vondersaar |
| 2017/0011264 | A1 | 1/2017 | Smolic |
| 2017/0068821 | A1* | 3/2017 | Jung ................... H04L 63/0428 |
| 2017/0068870 | A1 | 3/2017 | Lindholm |
| 2017/0249339 | A1 | 8/2017 | Lester |
| 2017/0278135 | A1 | 9/2017 | Majumdar |
| 2018/0005666 | A1* | 1/2018 | Yang ................... G11B 27/326 |
| 2018/0197577 | A1 | 7/2018 | Farre Guiu |
| 2018/0255340 | A1 | 9/2018 | Hiten |
| 2021/0382934 | A1 | 12/2021 | Xu et al. |

FOREIGN PATENT DOCUMENTS

| | | | |
|---|---|---|---|
| EP | 3022639 | B1 | 10/2018 |
| WO | 2019/036162 | A1 | 2/2019 |

OTHER PUBLICATIONS

Gopal Krishman, "Selecting the best artwork for videos through A/B testing", techblog.netflix.com, May 3, 2016, 13 pages.

Choi et al. "A framework for automatic static and dynamic video thumbnail extraction." Multimedia Tools and Applications 75.23 (2015): 15975-15991. (Year: 2015).

Gao et al. "Thematic video thumbnail selection." 2009 16th IEEE International Conference on Image Processing (ICIP). IEEE, 2009. (Year: 2009).

Segran. "Netflix Knows Which Pictures You'll Click on—and Why." Fast Company. Retrieved from <www.fastcompany.com/ 3059450/netflixknowswhichpicturesyoullclickonandw- hy> Accessed Jun. 23, 2017.

Tian et al. "Fashion Image Retrieval with Text Feedback by Additive Attention Compositional Learning" WACV IEEE Conference 2023, 11 pages.

Conlon, Danny. "Guide to Google Lens Search & Its Impact on Your Marketing Program." Ignite Visibility. Oct. 22, 2024. https:// ignitevisibility.com/google-lens-search/ 28 pages.

Agarwal et al., "Omni Search Sage: Multi-Task Multi-Entity Embeddings for Pinterest Search" arXiv:2404.16260v1 [cs.IR] Apr. 25, 2024; 10 pages.

Baltescu et al., "Item Sage: Learning Product Embeddings for Shopping Recommendations at Pinterest" arXiv:2205.11728v1 [cs. IR] May 24, 2022; 9 pages.

Jing et al., "Visual Search at Pinterest" arXiv:1505.07647v2 [cs.IR] Oct. 13, 2015; 10 pages.

Jing et al., "Visual Search at Pinterest" arXiv:1505.07647v3 [cs.IR] Mar. 8, 2017; 10 pages.

Shiau et al., "Shop the Look: Building a Large Scale Visual Shopping System at Pinterest" arXiv:2006.10866v1 [cs.IR] Jun. 18, 2020; 10 pages.

Ying et al., "Graph Convolutional Neural Networks for Web-Scale Recommender Systems" arXiv:1806.01973v1 [cs.IR] Jun. 6, 2018; 10 pages.

Zhai et al., "Learning a Unified Embedding for Visual Search at Pinterest" Applied Data Science Track Paper, KDD '19, Aug. 4-8, 2019, Anchorage, AK, USA; 9 pages.

Zhai, Andrew "Introducing a new way to visually search on Pinterest" dated Nov. 8, 2015, retrieved from https://medium.com/ pinterest-engineering/introducing-a-new-way-to-visually-search-on-pinterest-67c8284b3684 retrieved on Oct. 17, 2025; 8 pages.

Kislyuk, Dmitry, "Introducing automatic object detection to visual search" dated Jun. 28, 2016 retrieved from https://medium.com/ pinterest-engineering/introducing-automatic-object-detection-to-visual-search-e57c29191c30 retrieved on Oct. 17, 2025; 11 pages.

Kislyuk, Dmitry, "Introducing the future of visual discovery at Pinterest" dated Feb. 8, 2017 retrieved from https://medium.com/ pinterest-engineering/introducing-the-future-of-visual-discovery-on-pinterest-48fb469b0d67 retrieved on Oct. 17, 2025; 12 pages.

Jeong, Wonjun, "Engineering Shop the Look on Pinterest" dated Feb. 10, 2017 retrieved from https://medium.com/pinterest-engineering/ engineering-shop-the-look-on-pinterest-45bdfa7a8d03 retrieved on Oct. 17, 2025; 14 pages.

Zhai et al., "Visual Discovery at Pinterest" arXiv:1702.04680v2 [cs.IR] Mar. 25, 2017; 10 pages.

Microsoft Bing Blogs, "Beyond text queries: Searching with Bing Visual Search" dated Jun. 1, 2017 retrieved fromhttps://blogs.bing. com/search-quality-insights/2017-06/beyond-text-queries-searching-with-bing-visual-search retrieved on Oct. 17, 2025; 8 pages.

* cited by examiner

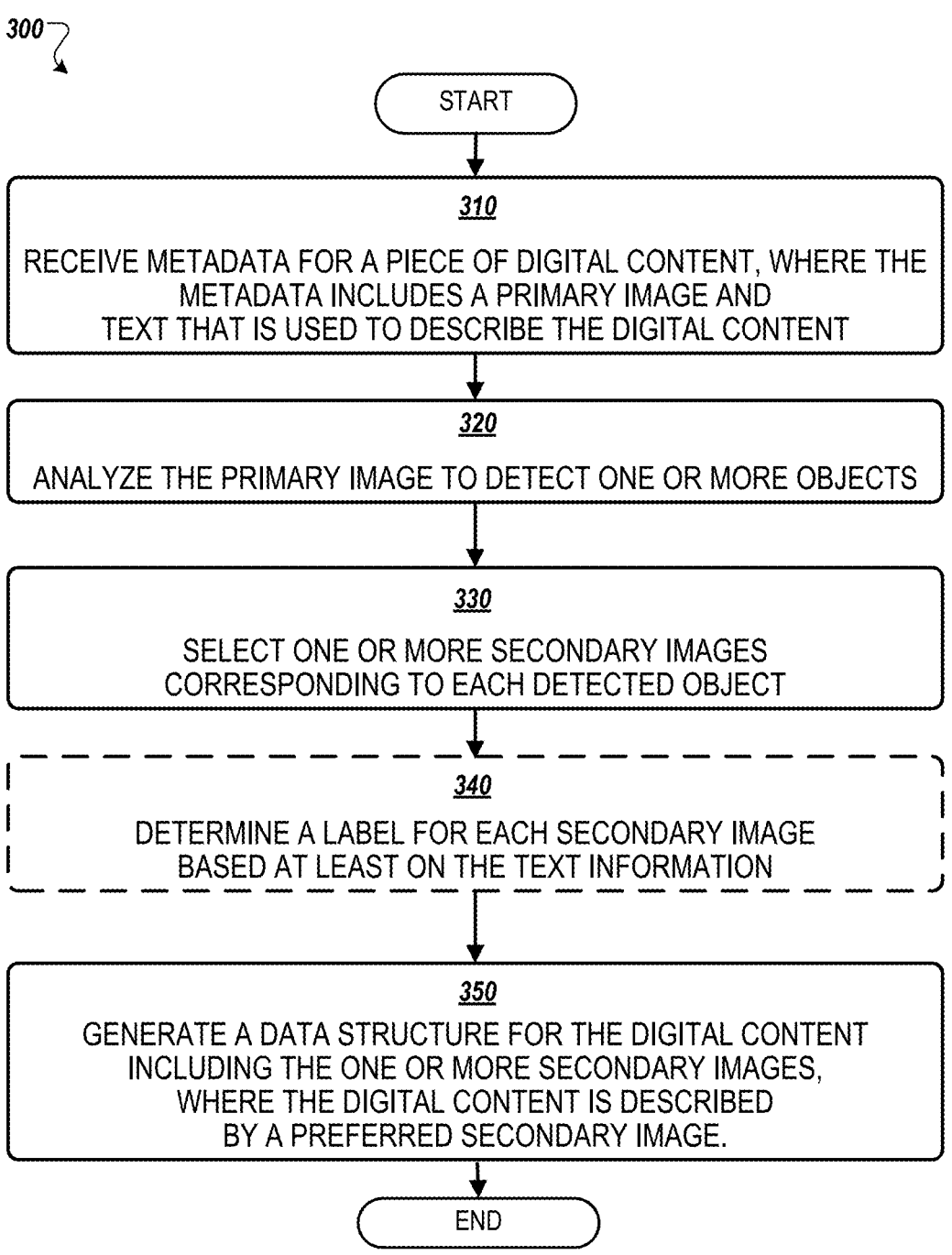

*300*

START

310

RECEIVE METADATA FOR A PIECE OF DIGITAL CONTENT, WHERE THE METADATA INCLUDES A PRIMARY IMAGE AND TEXT THAT IS USED TO DESCRIBE THE DIGITAL CONTENT

320

ANALYZE THE PRIMARY IMAGE TO DETECT ONE OR MORE OBJECTS

330

SELECT ONE OR MORE SECONDARY IMAGES CORRESPONDING TO EACH DETECTED OBJECT

340

DETERMINE A LABEL FOR EACH SECONDARY IMAGE BASED AT LEAST ON THE TEXT INFORMATION

350

GENERATE A DATA STRUCTURE FOR THE DIGITAL CONTENT INCLUDING THE ONE OR MORE SECONDARY IMAGES, WHERE THE DIGITAL CONTENT IS DESCRIBED BY A PREFERRED SECONDARY IMAGE.

END

FIG. 3

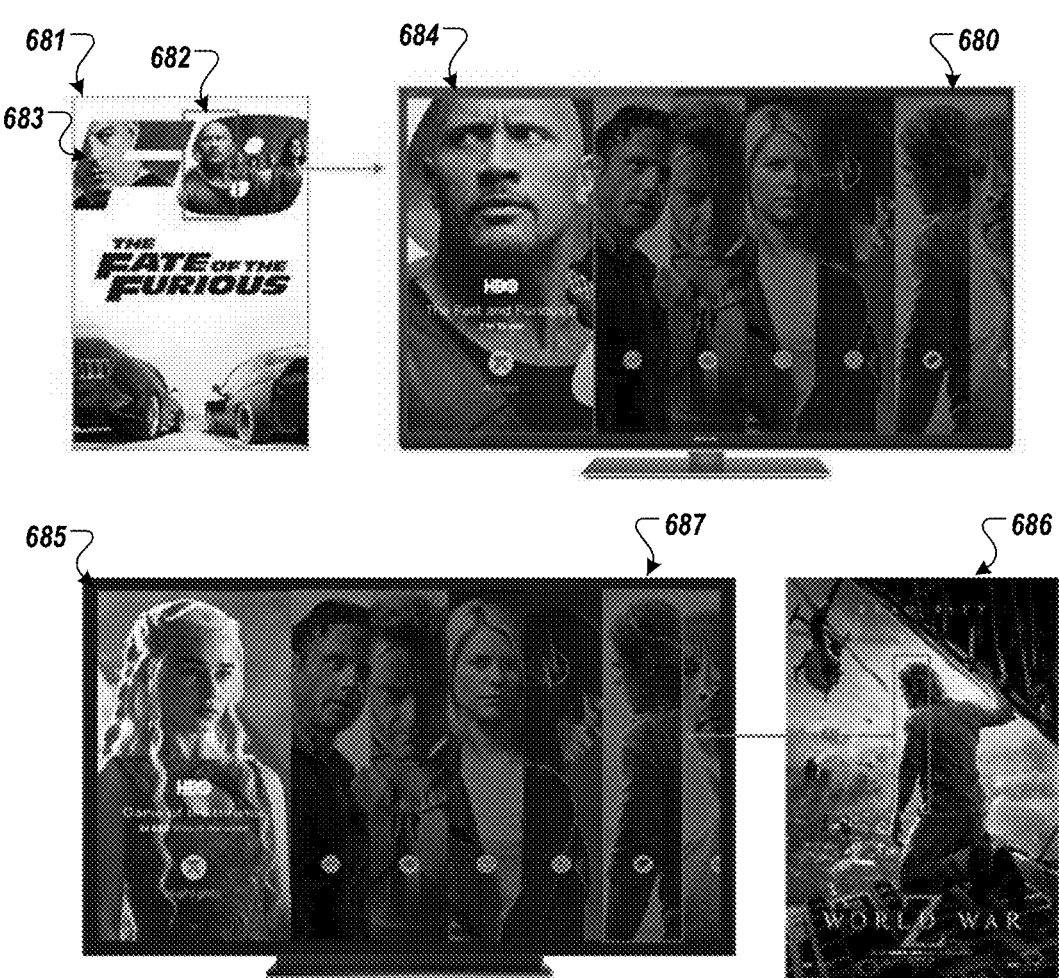
FIG. 6C

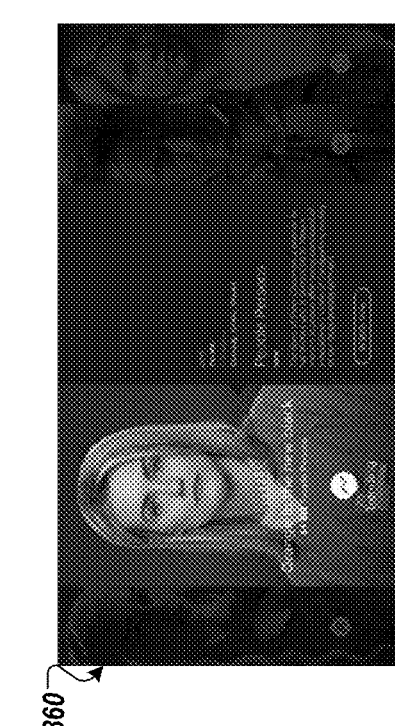
FIG. 8C

MULTIMEDIA FOCALIZATION

CROSS-REFERENCE TO RELATED APPLICATIONS

This application is a continuation of U.S. patent application Ser. No. 16/935,539 filed Jul. 22, 2020, which is a continuation of U.S. patent application Ser. No. 15/679,673, filed Aug. 17, 2017, both of which are hereby incorporated by reference in their entirety and for all purposes.

TECHNICAL FIELD

The present disclosure relates generally to multimedia control, and is more specifically related to image analysis for conditional control multimedia focalization.

BACKGROUND

Historically, viewers flipped through a cycle of channels to discover what broadcast content was available. Modern digital multimedia content delivery includes metadata to describe each item of available content, such as a title and short description. Users (e.g., potential viewers) generally navigate a text grid or series of menus that might include show art to discover or navigate available content. Typically, users review detailed items of show art that represents the genre or story line associated with the item of content. Content providers such as movie producers or television show creators compete for viewer's interest during the content selection stage using show art to communicate the subject matter of the content and persuade the viewer to select the content.

Conventionally, administrators or producers spend countless hours editing and constricting a piece of show art to capture potential viewer's attention. For example, a movie producer may develop a small library of different pieces of show art to market the content and persuade viewers to watch their movie. Related art systems use creative designs and focus groups to create show art images that communicate multiple aspects regarding the subject matter of content in order to attract the attention of a broad group of potential viewers. For example, a movie may have multiple different posters produced in order to attract large segments of a target audience. For example, one piece of show art may be designed to communicate the genre of the digital content, another piece of show art be designed to communicate the cast or lead actor featured in the digital content, and another piece of show art is designed to communicate schedule information (e.g., date and time of viewing or the sports teams being featured).

Related art studies have shown that reading text about digital content is ineffective in eliciting a decision from potential viewers. Related research shows that images overwhelmingly influence a viewer's choice in selecting digital content. For example, the related research indicates that viewers typically spend one to two seconds considering each title when navigating a library of streaming media, with the majority of time spent accessing the show art. Further, research has shown that people are able to recognize images of faces substantially faster than objects.

Related art content navigation systems may directly provide the show art provided by the content provider. In related art systems, data scientists analyze user statistics to track reactions to images and creative teams modify the colors, images and words that are used as show art. Additionally, displays of images with text improve viewer's decision making processes. However, the images (e.g., show art) have become more complex in order to appeal to more segments of a potential viewer. Since images are more complex, viewers require additional time to analyze the image to locate objects that are of interest that aid in making a determination on whether or not to view the item the content.

In the related art, focal point detection is used in cameras for adjusting image capture setting. In other related art, facial recognition systems are cable of identifying or verifying a person's identity from a digital image or a video frame from a video source.

With the explosive growth of on-line digital libraries and streaming digital media delivery services, viewers have access to an overwhelming amount of digital content to navigate. Accordingly, tools are needed to improve user navigation and interaction with image-based navigation of digital content.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 3 illustrates a flow diagram for generating a point of interest data structure in accordance with an example implementation.

FIGS. 6A-C illustrate example focalized interface in accordance with example implementations.

FIGS. 8A-C illustrate example interface control options in accordance with example implementations.

DETAILED DESCRIPTION

Figure 1:
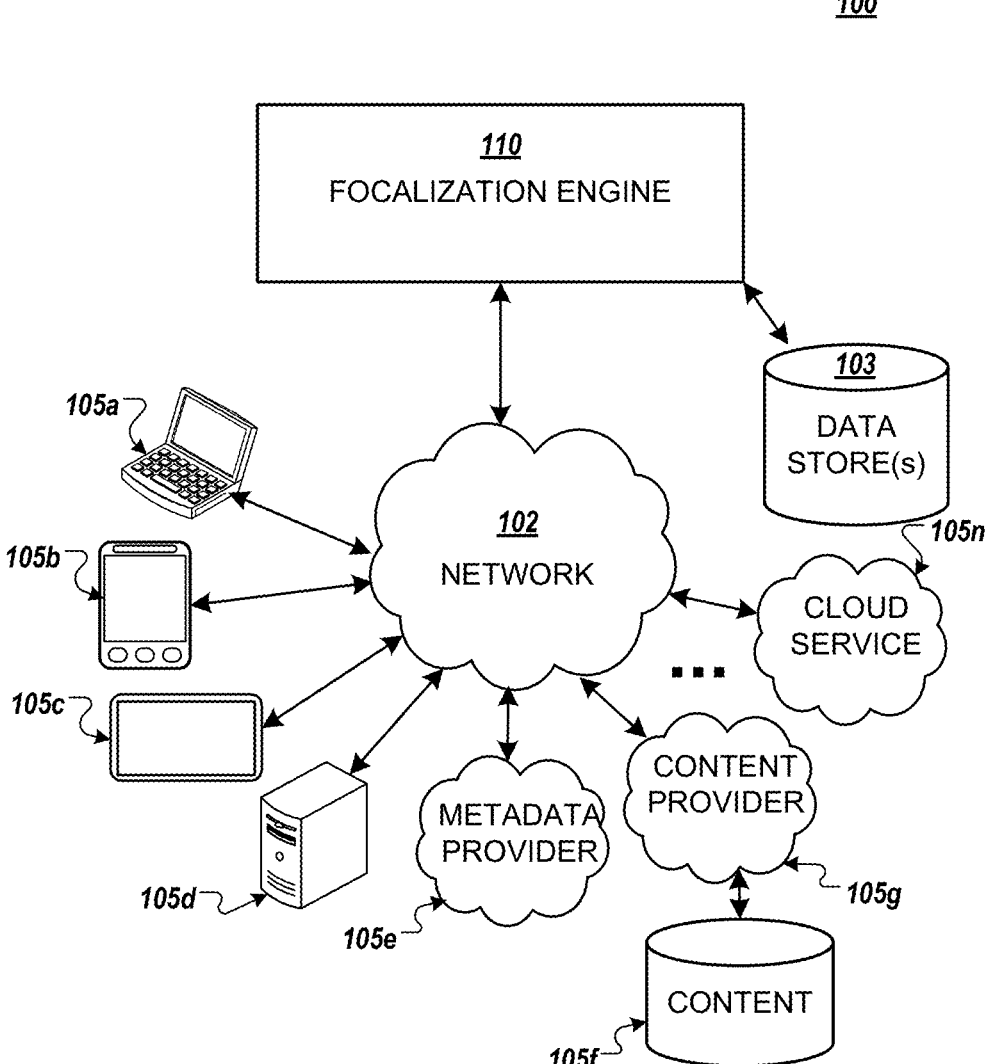
FIG. 1 illustrates a block diagram of a focalization system in accordance with an example implementation.

The present disclosure is directed to identifying multiple secondary images to describe a piece of digital content (e.g., video, audio, text, etc.) that can be used to provide individualized menus based on user information.

A show art image (e.g., a primary image) refers to an image used to describe a piece of content, for example, as a movie poster or a DVD cover. For digital content navigation, content providers deliver a show art image to describe a piece of available digital content for display in menus or sub-menus to potential viewers. Potential viewers can browse through text or image-based menus and view the show art images to assist with determining whether to select a piece. Since content providers conventionally determine the show art image to use that describe a movie or television show, the same common show art image is used for all the potential viewers. Navigation interfaces (e.g., menus) for large online collections of digital content conventionally use common show art images to allow potential viewers to browse the available digital content.

As described herein, systems and methods provide improved image processing of show art images (e.g., primary images) by analyzing each show art image to identify multiple sub-images (e.g., secondary images) within the primary image. A preferred sub-image (e.g., preferred secondary image) may be presented to a potential viewer based on an affinity or preference of the potential viewer. In an example implementation, a navigation interface presents the potential viewers a preferred sub-image of the common show art image based on their user information rather than the common show art image. For example, a show art image of seven people selected by the content provider can be replaced or resized to present or highlight a preferred sub-image of one of the actresses depicted in the common show art image. The potential viewer can recognize the actress in the preferred sub-image in less time than scanning the common show art image. For example, the common show art image requires the potential viewer to scan the seven people depicted to determine if any of the seven people are recognizable while the preferred sub-image of one of the people takes less time for the potential viewer to process.

In the example implementation, the preferred sub-image is selected based on information associated with the potential viewer. For example, the sub-image of the actress can be selected from among multiple sub-images within the show art image (e.g., a sub-image for each of the seven people) using information about the potential viewer (e.g., based on the potential viewer's viewing history). The potential viewer is more likely to recognize, or recognize more quickly, the preferred sub-image that corresponds with their user information than the common show art image that was pre-selected by the content provider or producer.

To browse through pieces of digital content, a navigation interface can be presented with preferred sub-images for each piece of digital content that is selected based on the user's information (e.g., a preferred secondary image). A menu of preferred secondary images rather than the common show art images can decrease user recognition time and user browsing time. Thus, the menu of preferred secondary images better describe the collection content than the common show art images.

In some implementations, an image-based menu of secondary images can include a sub-image of a primary image or a supplemental image from a database. For example, an actress's headshot photo from a database (e.g., a supplemental image) may be presented rather than the actress's image from the show art image. In another example, the potential viewer can view a supplemental image (e.g., a secondary image) that describes a piece of digital content based on their user information rather than the common show art image. For example, an actress's headshot photo from a database (e.g., a supplemental image) may be presented to describe a movie rather than the common show art image featuring a large boat. An image-based menu of secondary images (e.g., a sub-image of the common show art image or a supplemental image to replace the common show art image) can decrease user navigation time and improve user engagement.

As used herein, focalization refers to determining one or more points of interest in digital content (or within a digital library) to direct a viewer's attention. In an example implementation, the one or more points of interest in an image can be focal points. For example, a picture with multiple faces can be focalized to detect the multiple faces and determine one of the faces to direct the attention of the viewer. In an example implementation, attention is directed to a point of interest by resizing (e.g., zooming, cropping, snippet, etc.), blurring, filtering, framing, etc.

In another example implementation, the one or more points of interest in a video can be a set of frames. For example, a long video with multiple scenes (e.g., camera shots, backgrounds, etc.) can be focalized to detect the multiple scenes and determine one of the scenes to direct the attention of the viewer.

In an example aspect of the present disclosure, a focalization engine detects one or more points of interest in a common show art image (e.g., the primary image) associated with a piece of digital content (e.g., a movie or television show), assigns a label to each point of interest, and generates data structures to identify each point of interest so that one of the points of interest can be presented as a secondary image (e.g., a sub-image of the common show art image or a supplemental image to replace the sub-image from the common show art image). By selecting a point of interest of the common show art image that corresponds with the user information, the viewer can more quickly process the points of interest than the overall show art image and identify an aspect of the digital content associated with the secondary image (e.g., a sub-image of the common show art image or a supplemental image). In an example implementation, a menu for available digital content is presented to the viewer to navigate (e.g., browse, scroll, click-through, flick, etc.) through focalized images (e.g., secondary images) rather than the common show art images (e.g., primary images). The secondary images can reduce the recognition time needed for processing complex images (e.g., the common show art images). An image-based menu with secondary images (e.g., a sub-image of the common show art image or a supplemental image) focuses the viewer's attention to locate digital content that corresponds to the viewer's interests.

The focalization engine can perform a quality test to detect that a sub-image of the common show art image for point of interest is too small or obscured to represent the digital content in the menu. If the sub-image of the common show art image fails the quality test, the focalization engine can access a third-party library to retrieve the supplemental image for the point of interest. For example, in response to detecting presentation of the sub-image pixilates (e.g., enlarging the image beyond a resolution threshold), the focalization engine can retrieve a higher quality supplemental image for the point of interest. The focalization engine can prevent the sub-image from being enlarged so far that individual pixels that form the image are viewable and avoid reducing the recognition speed of the secondary image.

Aspects of the present disclosure may include a system and method for individualized multimedia navigation and control including receiving metadata for a piece of digital content, where the metadata comprises a primary image and text that is used to describe the digital content; analyzing the primary image to detect one or more objects; selecting one or more secondary images based on each detected object; and generating a data structure for the digital content comprising the one or more secondary images. A label for each secondary image can be determined based on the metadata or facial-recognition techniques to aid in selecting the secondary image that corresponds to the user information. Then, the digital content can be described by a preferred secondary image that corresponding to user information rather than the primary image.

The detailed description provides further details of the figures and example implementations of the present disclosure. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

FIG. 1 illustrates an overview of a system 100 for use with a focalization engine 110 according to example implementations. The system 100 includes a focalization engine 110 configured to analyze metadata from a local data store 103 or via a network 102 from a metadata provider 105e or content provider 105f via cloud service 105n. The focalization engine 110 can analyze metadata that describe items of content from various data sources, such as live streaming services, digital repositories, on-demand services, etc.

Devices 105a-105n can include, for example, mobile computing devices 105a-105b (e.g., smart phones, laptops, tablets, etc.), presentation systems 105c, computing devices 105d (e.g., desktops, mainframes, network equipment, etc.), metadata libraries 105e, content repositories 105f, content providers 105g, as well as cloud services 105n (e.g., remotely available proprietary or public computing resources). The devices 105a-d can include devices such as electronic book readers, portable digital assistants, mobile phones, smart phones, laptop computers, portable media players, tablet computers, cameras, video cameras, netbooks, notebooks, and the like. The user devices 105a-d can also include devices such as set-top boxes, desktop computers, gaming consoles, digital video recorders (DVRs), media centers, and the like. The user devices 105a-d can connect to the network 102 by a private network, a WAN, a LAN, etc.

Items of content can include content from independent sources or intermediaries. For example, an operator head-end server can store source content (e.g., a content provider 105n, content data store 105f, etc.) or receive source content from one or more content source providers. As used herein, content providers collectively refer to metadata provider 105e, intermediary content distributors, content sources, movie studios, production companies, content resellers, etc. For example, streaming content can come from an operator head-end server 105d or a HTTP streaming server (HSS) that accesses content available in packets organized as a MPEG2 program stream (MPG-PS), HTTP Live Streaming (HLS), etc. For example, a content source provider can provide digital content of a live sporting event video. An operator head-end server 105d may include physical machines and/or virtual machines hosted by physical machines (e.g., rackmount servers, desktop computers, or other computing devices).

Devices 105a-105n may also collect information (e.g., content history data, viewer profile data, feedback data, etc.) from one or more other device 105a-105n and provide the collected information to the focalization engine 110. For example, devices 105a-105n can be communicatively connected to the other device using WiFi®, Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols.

Devices 105a-d can be associated with and identifiable by a unique user device identifier (e.g., a token, a digital rights profile, a device serial number, etc.). In an implementation, the user device 105a-d may be a network level device with an activity tracking service used to track a user's activates, interests, behaviors, etc. or track activity of the device (e.g., cookies, global logins, etc.). The tracking service can identify a unique identifier for each end user (e.g., a token, a digital rights profile, a device serial number, etc.). For example, Video on demand (VOD) service can stream content through a set-top box, a computer or other device, allowing viewing in real time, or download content to a device such as a computer, digital video recorder or other portable media player for viewing. The tracking service can track the accessed or requested content as well as other demographic or marketing information about a user's interests. A unique user identifier may be used to authenticate the device and allow VOD streaming, pay-per-view streaming, downloading to a DVR, etc. The user devices 105a-d typically send a request for metadata to describe available content (herein a "metadata request") that includes an identifier to associate the user with user information.

The focalization engine 110 can interact with client devices 105a-105n, metadata provider 105e, cloud services 105n, etc. and to analyze metadata for content and provide secondary images based on user information. The focalization engine 110 may be implemented in the form of software (e.g., instructions on a non-transitory computer readable medium) running on one or more processing devices, such as the one or more devices 105a-105d, as a cloud service 105n, remotely via a network 102, or other configuration known to one of ordinary skill in the art. For example, the focalization engine 110 can be hosted via client devices 105a-105d, a cloud service 105n, or as part of the content delivery network 102 (e.g., a head-end service).

The focalization engine 110 directly or indirectly includes memory such as data store(s) 103 (e.g., RAM, ROM, and/or internal storage, magnetic, optical, solid state storage, and/or organic), any of which can be coupled on a communication mechanism (or bus) for communicating information. The terms "computer", "computer platform", processing device, and device are intended to include any data processing device, such as a desktop computer, a laptop computer, a tablet computer, a mainframe computer, a server, a handheld device, a digital signal processor (DSP), an embedded processor, or any other device able to process data. The computer/computer platform is configured to include one or more microprocessors communicatively connected to one or more non-transitory computer-readable media and one or more networks.

In an example implementation, the focalization engine 110 can be hosted by a cloud service 105n and communicatively connected via the network 102 to devices 105a-105n in order to send and receive data. The term "communicatively connected" is intended to include any type of connection, wired or wireless, in which data may be communicated. The term "communicatively connected" is intended to include, but not limited to, a connection between devices and/or programs within a single computer or between devices and/or separate computers over the network 102. The term "network" is intended to include, but not limited to, packet-switched networks such as local area network (LAN), wide area network (WAN), TCP/IP, (the Internet), and can use various means of transmission, such as, but not limited to, WiFi®, Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols.

In some implementations, the data store 103 stores duplicate copies or portions of metadata received for the digital content. In an alternative implementation, a data structure for processing metadata is generated and stored by focalization engine 110 in the data store 103. In another implementation, the focalization engine 110 can store a data structure for processing metadata in a cloud storage service 105*n*.

Figure 2:
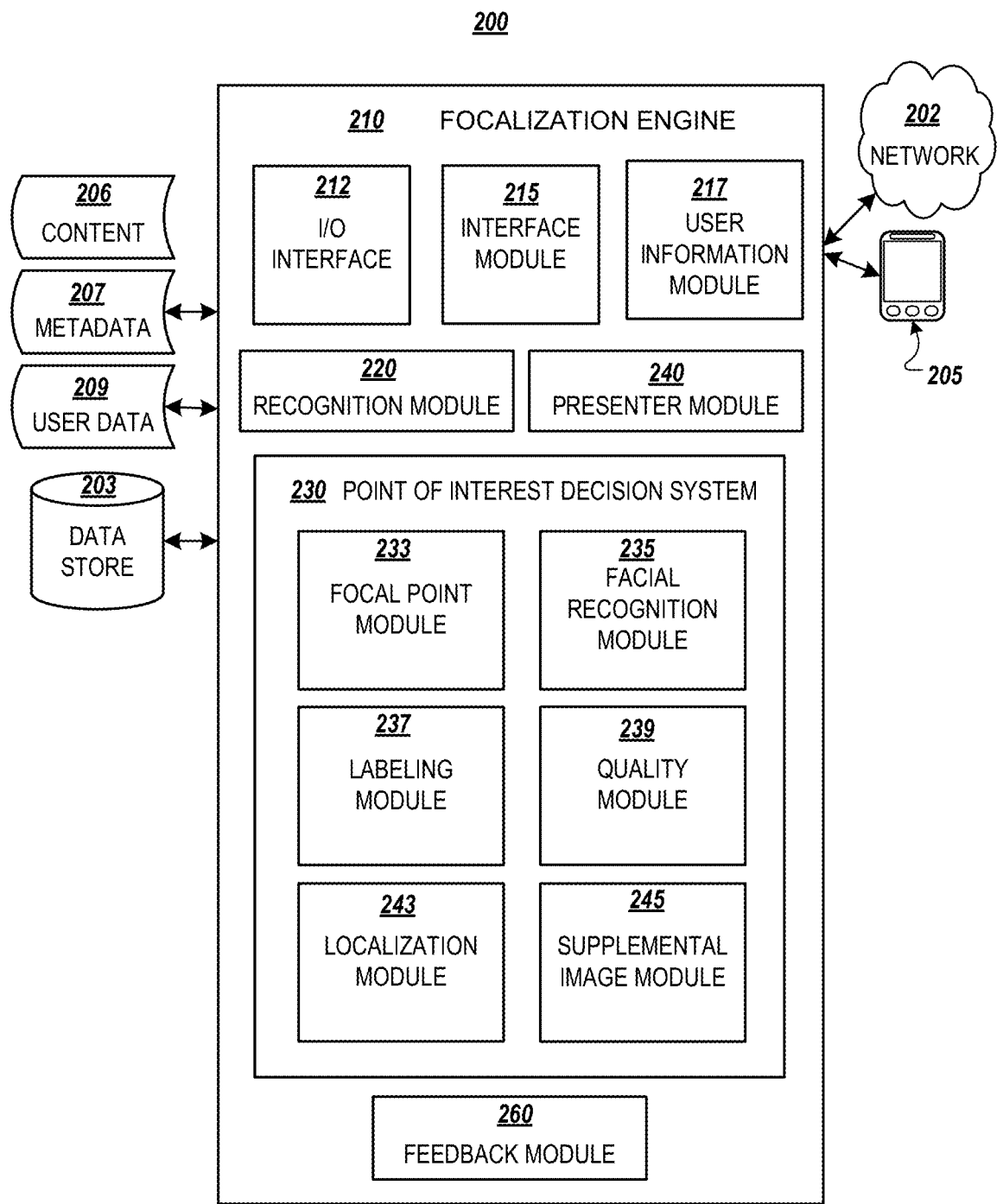
FIG. 2 illustrates an example focalization engine in accordance with an example implementation.

FIG. 2 illustrates an example system 200 including a focalization engine 210 in accordance with an example implementation. The focalization engine 210 includes one or more I/O interfaces 212, an interface module 215, a user information module 217, a point of interest decision system 230, and a feedback module 260. The focalization engine 210 is coupled to one or more data stores 203 for storing data (e.g., metadata 207, data structures, images, user data 209, etc.). The focalization engine 210 can analyze metadata 207 for an item of content 206 with an image to identify one or more points of interest, analyze a synopsis of content from the metadata 207, determine a label for each point of interest based on the metadata 207, and provide a secondary image with one of the points of interest based on user data 209 in response to a request. Metadata 207 associated with multiple content sources can be analyzed to provide integrated user interfaces with menus to efficiently navigate content 206, where the menus are tailored based on the user interests.

In an example implementation, the I/O interface 212 includes one or more communication interfaces communicatively connected with a network 202 or different types of devices 205 (e.g., devices 105*a*-105*n* of FIG. 1.) The I/O interface 212 can receive metadata 207 (e.g., show art image, episode information, etc.) associated content 206 (e.g., videos) from different sources, such as a data store 203, different types of devices 205, or via a network 202. In an example implementation, the I/O interface 212 can receive metadata 207 without receiving the content 206 via the network 202. The combinations listed here are illustrative examples, and other combinations as would be understood by those skilled in in the art may be substituted therefore.

Metadata 207, and/or user data 209 can be received by the focalization engine 210 in real-time or retrieved from data store 203 or data sources via the network 202. For example, metadata 207 can include a common show art image to represent the content 206 via a content selection interface from the content selection module 215.

Metadata 207 can include a text summary of the content, for example, a synopsis that describes the genre, characters, or plot themes. Images from the metadata 207 can be analyzed to extract points of interest, such as faces or landmarks. Text from the metadata 207 can be analyzed to extract labels to associate with a point of interest, such as names of characters, actors, actresses, athletes, sports team names, filming locations, etc.

User data 209 can also include information about a user, such as location, demographics, profile information, a content viewing history, user feedback, user interests, etc. User information module 217 can process received user data as well as search or request additional data. The user information module 217 can request user information from tracking services (e.g., on-line engagement tracking, etc.).

The focalization engine 210 includes a recognition module 220 and a presenter module 240 to analyze metadata 207, identify points of interest from the metadata 207, and provide alternative images (e.g., secondary images) for to aid in user navigation and selection of content 206. The recognition module 220 and presenter module 240 interact with the point of interest decision system 230 (PODS) according to the one or more algorithms described in reference to FIGS. 3-7.

The recognition module 220 via the point of interest decision system 230 analyzes metadata 207 for a collection of content 206 to identify secondary images to be provided for content selection. The recognition module 220 can identify secondary images as sub-images from the metadata 207 or acquire supplemental images from an external library to replace a primary image associated with a piece of content. The recognition module 220 can interact with the I/O interface 212, interface module 215, the sequence recommendation system 230, and feedback module 260 to generate and maintain sub-images extracted from metadata or data structures for extracting secondary images from metadata in real time, as described in reference to FIGS. 3-7. The recognition module 220 can identify multiple secondary images from a primary image.

The presenter module 240 receives or intercepts requests to provide metadata 207 describing content. The presenter module 240 can interact with the I/O interface 212, interface module 215, user information module 217, the PODS 230, and feedback module 260 to provide secondary images based on user data 209 in a content navigation menu. The presenter module 240 employs the user data 209 to customize the content navigation menu with secondary images that represent the content 206 and correspond to a user interest based on the user data 209 associated with a metadata request. A metadata request can be a request for metadata 207 associated with one or more collections of content from multiple data sources.

A customized content navigation menu with secondary images can be automatically generated or internally requested by the focalization engine 210. For example, in response to a metadata request, the focalization engine 210 via the recognition module 220, identify multiple secondary images for a piece of content, and the presenter module 240 can select one of the secondary images based on user data 209 to provide a customized content navigation menu for the content associated with metadata requested.

The POIDS 230 can include a focal point module 233, a facial recognition module 235, a labeling module 237, a quality module 239, a localization module 243, and/or a supplemental image module 245. The POIDS 230 interacts with the recognition module 220 and the presenter module 240 according to the one or more algorithms described in reference to FIGS. 3-7A-F. In an example implementation, the POIDS 230 includes an analysis process to identify points of interest from a common show art image of the metadata 207 via the focal point module 233, analyze a synopsis from metadata 207 to determine a label for each point of interest via the facial recognition module 235 and labeling module 237.

In an example implementation, the POIDS 230 includes a presentation process to provide secondary images with points of interest that correspond to user data 209. The presentation process can include testing a quality of the secondary images via the quality module 239, selecting an area around a focal point for presentation via the localization module 243, and/or determining to acquire a supplemental image as a secondary image via the supplemental image module 245.

In an example implementation, the secondary image is a supplemental image selected from a third-party database, where the supplemental image depicts an element of the metadata. For example, metadata for a piece of television content may include a list of cast members or a mention of a celebrity cameo in a particular episode, and the focalization engine can access a third-party library of celebrity headshots to retrieve a secondary image for an actor/actress to represent the digital content. For example, a viewer with a strong affinity towards a celebrity may quickly and easily recognize an image of the celebrity's face and help focus the viewer's attention on the digital content. The menu can present secondary images for available digital content to the viewer to navigate (e.g., browse, scroll, click-through, flick, etc.) through focalized images, where sub-images of each image is selected based on the viewer information to represent the digital content.

The feedback module 260 is configured to provide evaluation information back to the PODS 230 for refining and improving the POIDS 230 functionality. For example, the feedback module 260 can gather user input to update user interest, and/or improve selection of secondary images. The feedback module 260 can collect evaluation information from the user to change the secondary images selected to describe an item of content over time.

FIG. 3 illustrates a flow diagram 300 for generating a point of interest data structure in accordance with an example implementation. The diagram 300 is may include hardware (circuitry, dedicated logic, etc.), software (such as operates on a general purpose computer system or a dedicated machine), or a combination of both. The diagram 300 represents elements and combinations of elements for use with the focalization engine 110 of FIG. 1 and 210 of FIG. 2.

At block 310, the processing device receives metadata for a piece of digital content, where the metadata includes a primary image and text that is used to describe the digital content. For example, the digital content can be a television show, a movie, a podcast, a sporting event, etc. At block 320, the processing device analyzes the primary image to detect one or more objects.

At block 330, the processing device selects one or more secondary images based on each detected object. For example, the one or more secondary images can include a face of a person featured in the digital content. The digital content is described by the preferred secondary image as part of a menu to navigate a library of digital content.

At block 340, the processing device determines a label for each secondary image based at least on the text information. In an example implementation, the processing device can analyze the image to detect one or more objects based on facial recognition; and determine the label for each secondary image based on matching the facial recognition with a name in the text information of the metadata. For example, determining the label can include calculating a confidence score for each secondary image's relation to a portion of the text from the metadata and searching a library of labeled images based on the detected object. In an example, the secondary images can be ordered based on the size of the object in the secondary image in view of the other objects detected from the image, and determining the label for each secondary image is based on associating key fields in the text information based on the order of the secondary images.

At block 350, the processing device generates a data structure for the digital content including the one or more secondary images and labels, where the digital content is described by a preferred secondary image based on the label associated with the preferred secondary image corresponding to user information.

In an example implementation, the processing device can select one or more secondary images for each detected object. The processing device can identify a portion of the image for each detected object and generate the data structure by storing the identified portion for each secondary image.

In an example implementation, the processing device can select one or more secondary images for each detected object. The processing device can identify a set of secondary image coordinates of the image for each detected object and generate the data structure. The data structure includes the set of secondary image coordinates for each secondary image. The processing device can, in response to the data structure comprising a label corresponding to a user preference of the set of user information, search the image for the secondary image of the label based on the set of secondary image coordinates, and present a portion of the image based on the set of secondary image coordinates for the secondary image of the label.

In an example implementation, the processing device can receive a request for the piece of digital content and a set of user information. In response to the data structure including a label corresponding to a user preference of the set of user information, the processing device presents the secondary image for the label as the preferred secondary image. The secondary image describes the digital content, as discussed in in further detail in reference to FIGS. 5-8. For example, user information can include heuristics or activity tracking to determine a user preference.

Figure 4A:
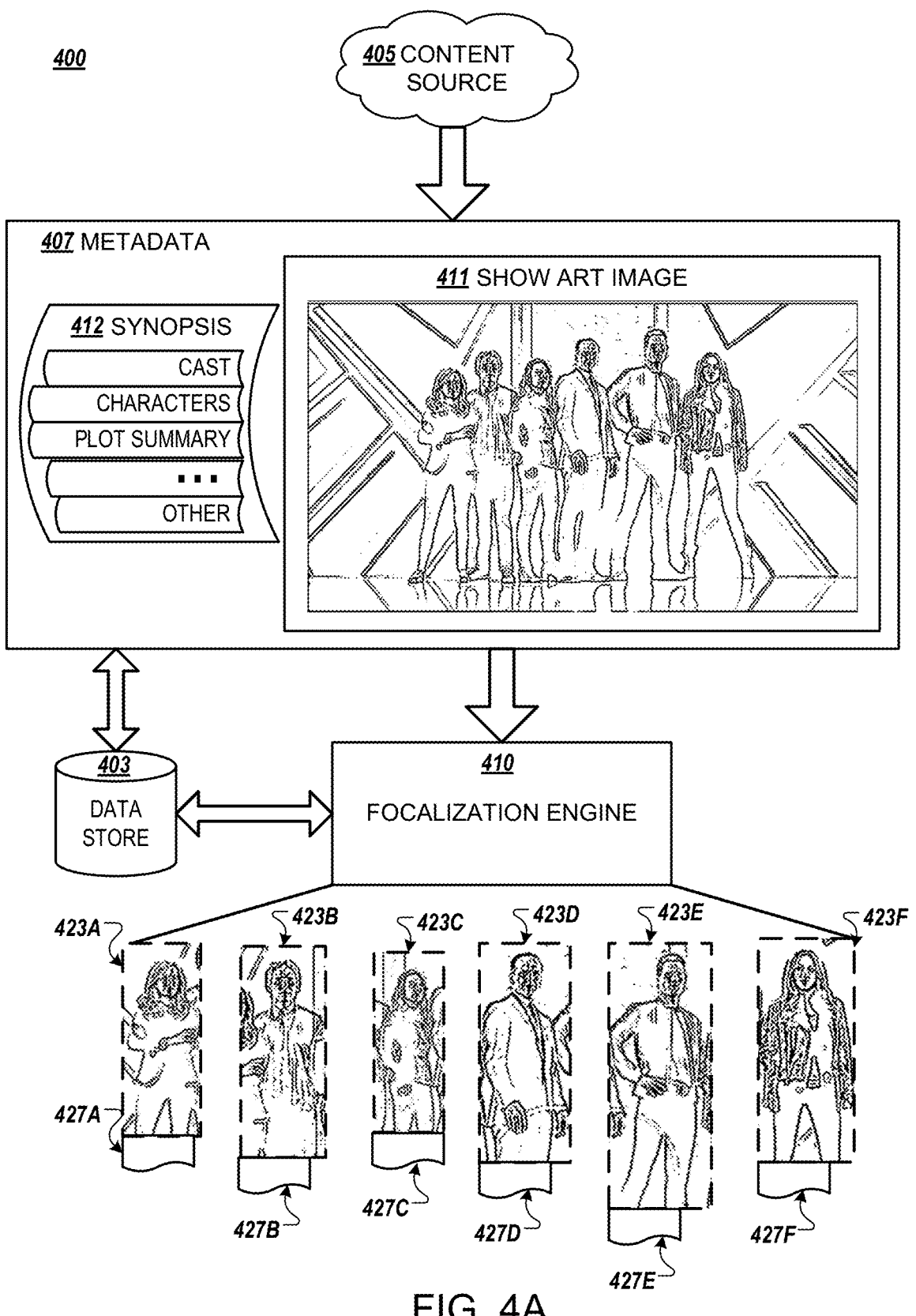
FIGS. 4A-B illustrate a block diagram and flow chart for generating focal images in accordance with example implementations.

FIG. 4A illustrates a block diagram 400 for generating focal images in accordance with example implementations. In an example implementation, metadata 407 associated with a piece of digital content is received by a focalization engine 410, for example from a content source 405 or metadata provider. The metadata 407 includes a common show art image 411 and a synopsis 412 (e.g., cast, characters, plot summary, etc.). The common show art image 411 can be in an image format (e.g., JPEG, JPG, PNG, EPS, PDF, PSD, AI, GIF, TIFF, BIT, etc.) and include an image, artwork, logo, picture, etc. that represents the piece of digital content during a content selection stage.

The common show art image 411 is typically created by a producer, creator, marketer, etc. of the digital content to persuade viewers to consume the digital content. Common show art image 411 may include complex images, such as a collage, with pictures of characters, logos, landmarks, stylized text, visual effects, etc. that requires time for users to process and understand an aspect of what subject matter (e.g., actors, genre, topics, etc.) is in the piece of digital content.

The synopsis 412 may also be created by a producer, creator, marketer, etc. of the digital content to persuade viewers to consume the digital content. The synopsis 412 can be text or links (e.g., uniform resource locators) to retrieve text that describes one or more aspects of the digital content. The synopsis 412 is typically used to enable control features, such as text based searches, parental controls, scheduled recordings, etc. In example implementations, the synopsis 412 is used with the common show art image 411 to determine a secondary image to represent the piece of digital content during a content selection stage that corresponds to user information, as described in greater detail in reference to FIGS. 6-8.

At 400, the process for generating focal images is illustrated using an example common show art image 411 with a picture of six actors and actresses standing in a line in front of a complex background of various shapes and colors (not shown) to represent the subject matter of the piece of digital content.

Since users browsing through large libraries of content may not spend the time to analyze each of the six faces, identify the actresses, actors, characters, etc., and interpret the genre of the piece of digital content, the focalization engine 410 can extract multiple features of the common show art image 411 to target representation of the piece of digital content. For example, a user may take the time analyze each of the first three faces starting from left to right, determine that the first three faces are unfamiliar, stop processing the common show art image 411 and proceed to another piece of digital content. When the fifth face from the left is the user's favorite character, the common show art image 411 has failed to effectively represent the piece of digital content to communicate an aspect of the subject matter that is relevant to the user.

The focalization engine 410 can analyze the common show art image 411 to detect multiple points of interest within the picture as potential secondary images to represent the piece of digital content to improve the ability of the common show art image 411 content to communicate an aspect of the subject matter that is relevant to the user in a short amount of time. In an example implementation, focalization engine 410 employs a data store 403 to store the multiple points of interests as sub-images to be recalled in response to a command during a content selection process. For example, the focalization engine 410 can detect a facial feature in the common show art image 411, crop the common show art image 411 to be a secondary sub-image 423A-423F stored in the data store 403.

In an example implementation, focalization engine 410 generates a data structure to store image coordinates for the points of interest. A set of image coordinates for each point of interest in the common show art image 411 can locate a central or centering point for the point of interest in the common show art image 411. The data structure for common show art image 411 associated with a piece of digital content can store multiple sets of image coordinates. The image coordinates of the data structure can be provided for use with the common show art image 411 to resize the common show art image 411 (e.g., crop, zoom, blur, etc.) to display the points of interests without storing an intermediary sub-image. The data structure can be stored and delivered asynchronously from the common show art image 411 image to allow for downstream selection (e.g., a client device) of which point of interest to display during a content selection process.

The image coordinates to locate a central or centering point for the point of interest can be used to resize the common show art image 411 to display a region around the central or centering point based on the client device settings (e.g., screen size, resolution, color settings, etc.) and/or menu settings (e.g., main menu selection size, sub-menu selection size, content detail menu size, etc.), as discussed in greater detail in reference to FIG. 8.

The point of interest sub-image or data structure can include a label 427A-427F for each point of interest secondary image. The synopsis 412 is used to label each point of interest using an algorithm that assesses the context in the common show art image 411. In an example implementation, the focalization engine 410 analyzes the context in the common show art image 411 using facial detection, facial recognition, object detection, etc. to categorize and/or rank the multiple points of interests, parses the available information from the synopsis 412 to categorize and/or rank the text information, determines whether the text information corresponds with a point of interest of the common show art image 411, and assigns the corresponding text as a label 427A-427F to the secondary image 423A-423F.

In the context of television shows and movies, one or more actresses and actors are typically assigned lead roles and additional actresses and actors are typically assigned supporting roles. The lead actresses is typically portrayed as the largest element in the in the common show art image 411 and the supporting actors may appear smaller than the lead actress in the background.

In the example, the focalization engine 410 can detect six faces in the common show art image 411 as multiple points of interests, categorize and/or rank the faces based on the size of each face, parses the available information from the synopsis 412 to categorize and/or rank the list of actresses and actors based on the importance of the role or order listed in the synopsis 412, determines whether the order listed the synopsis 412 corresponds with the size ordering of detected faces or sequence pattern in the common show art image 411, and assigns the corresponding actress or actor name as a label 427A-427F to the secondary image 423A-423F.

In the context of sporting event, a team logo, jersey, trophy, or featured athlete placed may typically be placed in a certain order to communicate the location of the event, a championship, or featured athlete that corresponds to the available information from the synopsis 412 to categorize the text information that corresponds to each point of interest.

In some implementations, the focalization engine 410 can employ external resources to assist with labeling the secondary images 423A-423F. For example, the focalization engine 410 can perform facial recognition using a library of celebrity headshot photos to select a candidate list of actors and/or actresses to associate with a secondary image, to verify an element from the synopsis 412 corresponds to the secondary image of the common show art image 411 (e.g., a primary image), or calculate a confidence score for the match between the element from the synopsis 412 matching the secondary image.

Figure 4B:
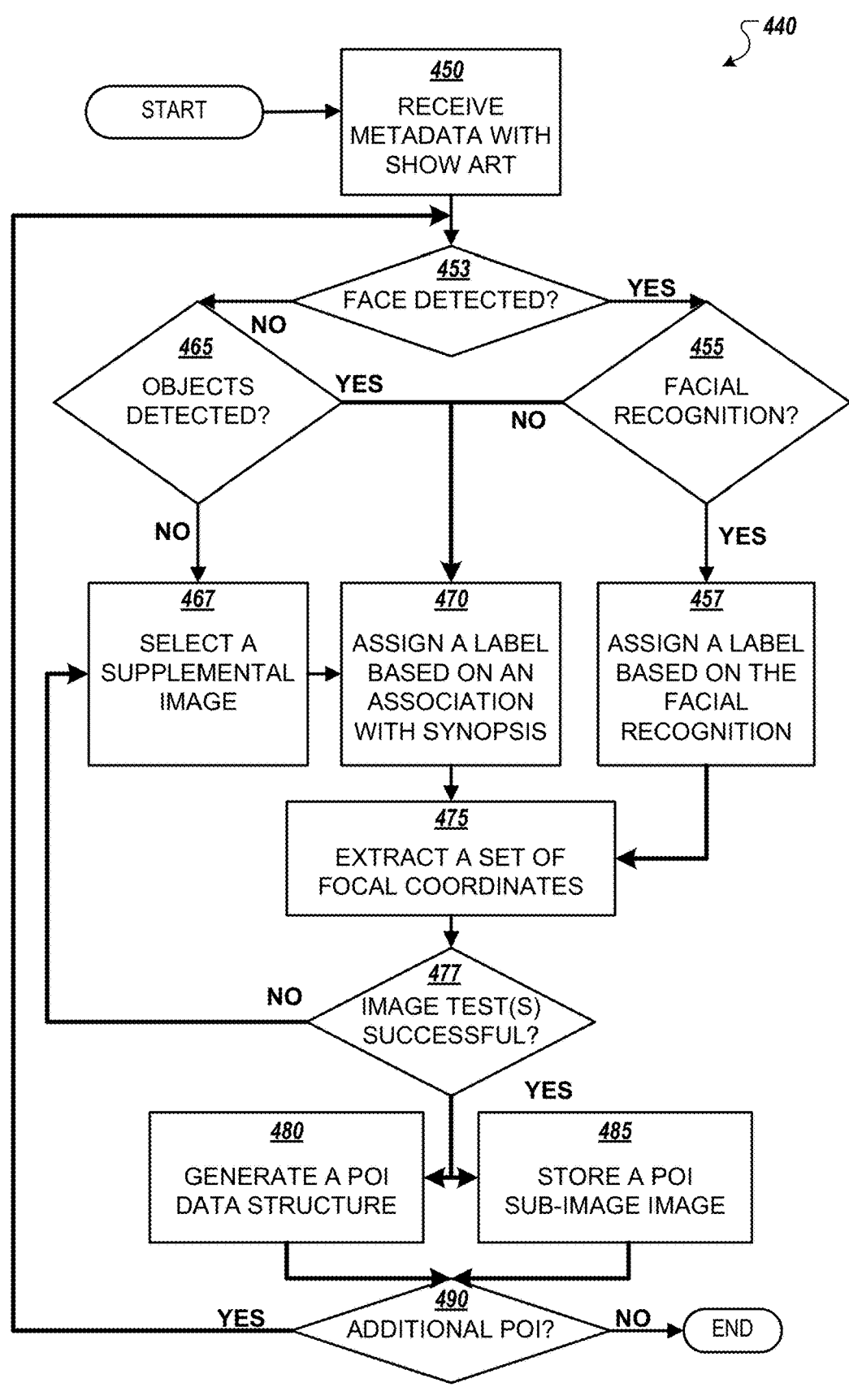

FIG. 4B illustrates a flow chart 440 for generating focal images in accordance with example implementations. At block 450, the processing device receives metadata with common show art image. At block 453, the processing device detects a point of interest for a face. In response to detecting a face in the common show art image, at block 455, the processing device performs facial recognition to determine an identity of the detected face.

If the facial recognition at block 455 is able to determine the identity of the detected face, the processing device assigns a label with the identity at block 457. If the facial recognition at block 455 is unable to determine the identity of the detected face, the processing device assigns a label based on an association with the metadata at block 470. For example, the largest detected face may be associated with the lead character listed in the metadata. The lead character listed in the synopsis can also be used to locate a supplemental image of lead character from a third party source (e.g., a celebrity headshot library).

The features of the supplemental image of the lead character can be compared to the features of the detected face to calculate a confidence score indicating whether to label the detected face with the name of the lead character. The process of searching for supplemental images based on the synopsis, comparing features of the supplemental image with a detected sub-image, and calculating a confidence score based on the comparison can be repeated for multiple entries in the synopsis.

The process 440 can proceed to block 475 to extract a set of focal coordinates for the detected face. In an example implementation, at block 480, a POI data structure including the focal coordinates for the detected face and label can be stored with an identifier of the common show art image. The POI data structure can be stored and/or transmitted to efficiently extract (e.g., crop, resize, zoom, etc.) the POI from the same show art image during a presentation process, as described in reference to FIG. 6.

In an example implementation, at block 485, a POI sub-image (i.e., a cropped sub-image) for the detected face and label can be stored. The stored POI sub-image can be recalled and transmitted to efficiently present the POI secondary image during a presentation process without accessing the primary image (e.g., show art), as described in reference to FIG. 6.

If a face is not detected at block 453, the process 440 at 465 can alternatively detect an object as a focal point. For example, a primary image (e.g., a show art image) including a detectable landmark, logo, etc. that can be assigned a label based on an association with the synopsis at 470. Otherwise, the process 440 at 467 can alternatively select a region of the primary image (e.g., common show art image) or a supplemental image from a library as the secondary image.

The process 440 can proceed to store the object or supplemental image as a POI data structure at block 480 or POI sub-image at block 485. At block 490, the blocks 453-485 can repeat to detect additional points of interest in the common show art image for describing a piece of digital content.

Figure 5:
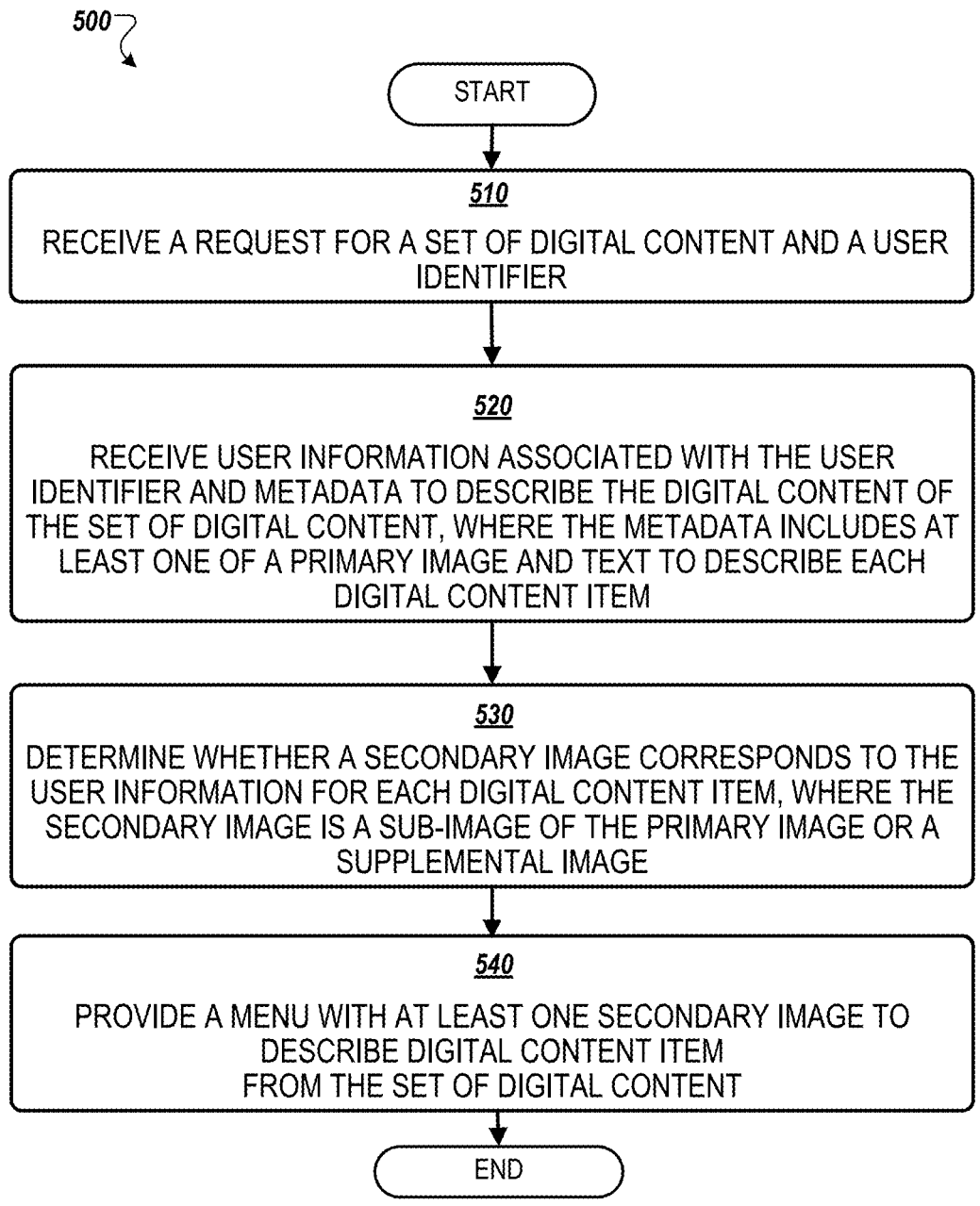
FIG. 5 illustrates a flow diagram for interface control in accordance with an example implementation.

FIG. 5 illustrates a flow diagram for a process 500 of interface control in accordance with an example implementation. At block 510, the processing device receives a request for a set of digital content and a user identifier. At block 520, the processing device receives user information associated with the user identifier and metadata to describe the digital content of the set of digital content, where the metadata includes at least one of a primary image and text to describe each digital content item.

At block 530, the processing device determines whether a secondary image corresponds to the user information for each digital content item, where the secondary image is a sub-image of the primary image or a supplemental image. At block 540, the processing device provides a menu with at least one secondary image to describe digital content item from the set of digital content based on the user information.

Figure 6A:
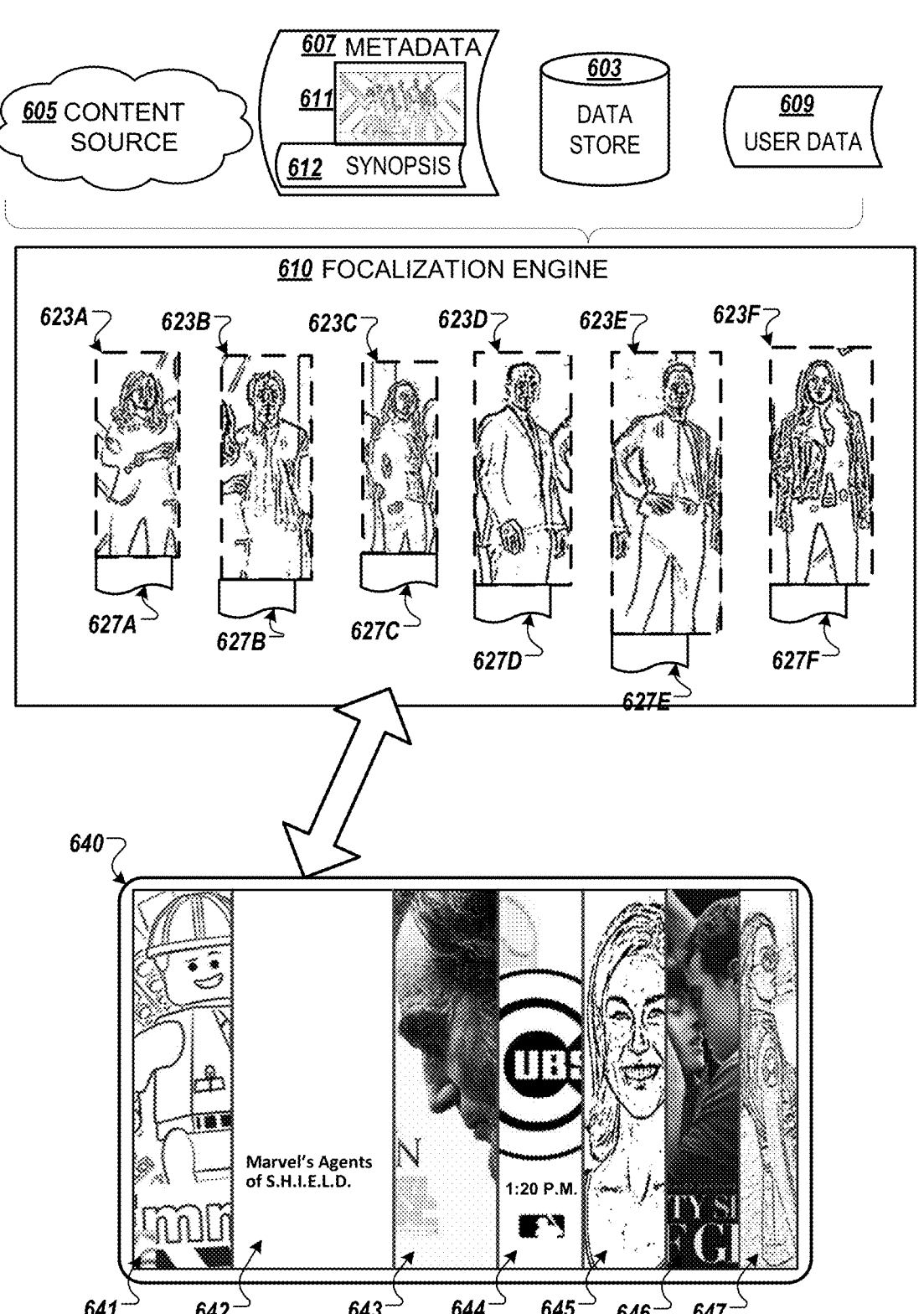
Figure 6B:
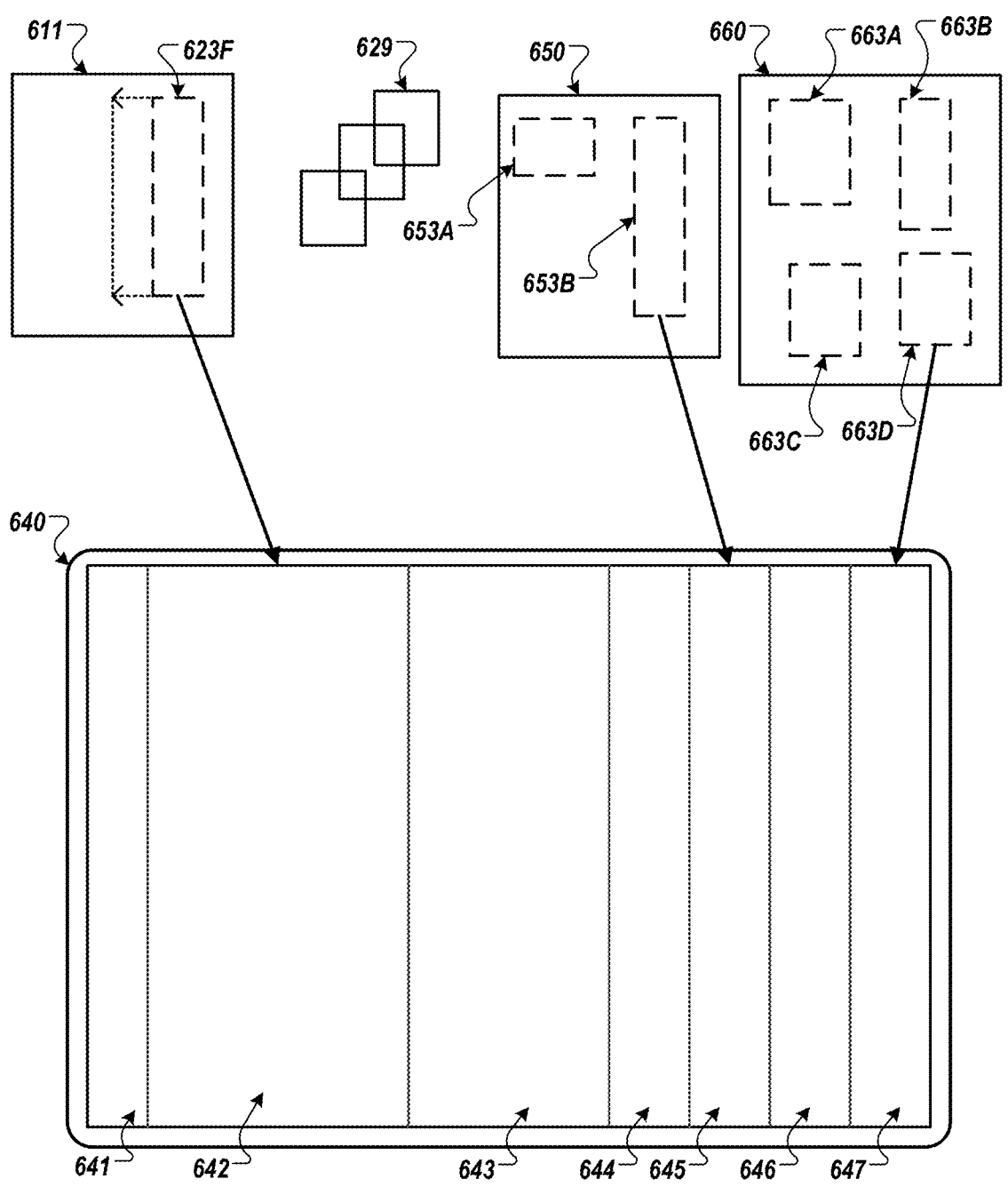

FIGS. 6A-C illustrate example process for presenting a focalized interface (e.g., display 640) in accordance with example implementations. FIG. 6A illustrates an example process for a focalized interface (e.g., a content navigation menu) in accordance with an example implementation. The focalization engine 610 can receive metadata 607 with common show art image 411 and a synopsis 612 (e.g., cast, characters, plot summary, etc.) associated with a piece of content from a content source 605. The focalization engine 610 can include a data store 603 and provide secondary images 623A-623E to a display 640 based on labels 627A-427E of secondary images 623A-623E corresponding to user information 609.

Viewers have difficulty navigating the large and growing number of options to watch streaming content as well as recorded and scheduled based content (e.g., broadcast events, live events, etc.). Users are overwhelmed with the amount of information provided and must spend additional time reviewing the information in order to identify content that is of interest. Otherwise users may read text about the video content to learn about the actors, plots, genre, etc. User information can be determined based on user viewing habits, location information, etc. Since each piece of digital content has multiple facets in order to elicit a connection with a potential viewer, the methods and systems described herein identify one of the facets that are likely to appeal to the viewer in order to efficiently communicate the most appealing aspect of the piece of digital content. The focalization engine 610 provides a new user experience with secondary images that are selected based on the user information or predilections In an example implementation, a network device (e.g., a focalization engine 610) can generate a library of sub-images for replacing a master image (e.g., a primary image) in the response request. Menu information is generally provided to client devices from an upstream provider. Typically, the client device downloads a collection of menu data that comprises a master image and metadata regarding available content. The client device provides a content navigation menu (e.g., focalized interface) with a set of options from the menu data for viewers to select and available piece of content.

In an example implementation, the client device can include logic (e.g., the focalization engine 610) for processing master images in order to select a sub-image. In some example implementations, the client device may receive coordinates for selecting secondary images, and process a master image using the set of coordinates to generate a display of secondary images. In some example implementations, a network server performs the secondary image processing prior to delivery to client devices. The network server performing secondary image processing improves bandwidth use of network resources by reducing the size of image files being delivered to client devices. Generating a data structure of coordinates for secondary images can be delivered to the client device. The client device can receive the master image from a third-party provider and employ the secondary image coordinates to present a customized display of show images based on a user's preference.

The focalization engine 610 provides functionality for selecting secondary images using facial recognition and object detection. In some example implementations, a secondary image may be a set of image coordinates for zooming or resizing a master image. The customized display of secondary images includes detected faces or objects that satisfy the user preference. By providing portions of master images, viewers are able to more quickly navigate multiple images because the focalization engine 610 selects the most relevant information from each master image to aid in the user selection.

In some example implementations, a show image may be a resized master image based on a point of interest or replaced with a cropped image of a master image. The focalization engine 610 can employ a facial detection process to inventory multiple faces. In some example implementations, the focalization engine 610 accesses a supplemental database in order to match the facial detection images with additional metadata regarding the subject of the image. Since show art images for digital content generally includes actors and actresses or landmarks or commonly recognized images such as logos. The supplemental database can include a library or inventory of metadata for the popular image subjects.

Master images may have different levels of image quality. The quality of a secondary image is related to the level of image quality of the master image. The focalization engine 610 can further validate the secondary image using an image quality test to ensure the secondary image is of sufficient quality to be displayed.

The display 640 can include a content navigation menu for describing seven different pieces of digital content in different panes 641-647. In the example, a pane 642 of the content navigation menu can describe a piece of digital content (e.g., Marvel's Agents of S.H.I.E.L.D) using different secondary images 623A-F. The content navigation menu can select which of the different secondary images 623A-F to present in the pane 642 based on the user information. The images displayed in panes 641, 643, 644, 645, 646, 647 can also be selected to describe the other pieces of digital content based on user information. For example, at pane 645 a logo that corresponds with the user information can be selected as the secondary image to describe a sporting event. In other examples, the secondary image for each pane can be selected based on popularity, image quality, region of the viewer, type of digital content, etc.

The content navigation menu is designed to enlarge the secondary image to fit a menu pane. In response to the secondary image failing the quality test, the focalization engine 610 can search third-party databases for alternative's images associated with the subject of the secondary image.

FIG. 6B illustrates an example process for a focalized interface to display 640 in accordance with an example implementation. In an example implementation, the display 640 can include multiple panes 641-647 for presenting images associated with different pieces of digital content described by different primary images 611, 629, 650, 660. Each pane provides a master image or primary image 611, 650, 660 and the focalization engine 610 determines a secondary image 623F, 653A, 653B, 663A-D for each primary image 611, 650, 660.

For example, a display 640 for a menu of available sports content can provide images for each event in each pane 641-647. Each image can include a featured athlete, a landmark associated with the location of the event, a logo for one of the teams, an object from the primary image such as a trophy or league logo, etc. that corresponds to the event for the pane. Further, the focalization engine 610 can select the relevant information from the metadata to be overlaid on each image of the display. For example a menu of available sports content can include icons indicating whether the sporting event is recorded, live, or scheduled. The overlaid content can include text extracted from the metadata (e.g., a movie title).

FIG. 6C depicts example focalized interfaces 680-690 in accordance with example implementations. Focalized interfaces 680, 685, 690 are image-based menus that describe pieces of digital content using secondary images that correspond to user information rather than a common show art image selected by a content provider or producer.

In an example, the focalized interface 680 includes a secondary image 684 based on a detected face 682 or 683 in a primary image 681 (e.g., a common show art image). The primary image 681 can include multiple faces 682, 683 as points of interest and select a point of interest that corresponds with user information. For example, if the user information indicates the user watches more Dwayne Johnson content than Vin Diesel content, the detected face 682 of Dwayne Johnson can be selected as the secondary image 684 to present to the user. The identity of the detected face 682 can be determined as Dwayne Johnson based on metadata of the common show art image (e.g., the primary image 681) or facial recognition techniques. The primary image 681 can be resized to present the detected face 682 for presentation as the secondary image 682 in a content selection menu (e.g., the focalized interface 680).

In another example, focalized interface 685 includes a secondary image 687 from a detected profile of a silhouette in a primary image 686. The primary image 686 is resized as a secondary image 687 for presentation to focus on the object in a content selection menu (e.g., the focalized interface 685).

In another example, focalized interface 690 illustrates a content selection menu for multiple pieces of digital content with a common subject matter (e.g., a common actor). For example, in response to a search query or term (e.g., an actor's name), focalized interfaces 690 can present search results with different pieces of digital content by displaying secondary images that include the search term or actor from the primary image or a supplemental image database. The focalized interfaces 690 presents a group of secondary images for different pieces of digital content, where each secondary image corresponds to the common subject matter (e.g., a menu theme, search query, etc.) for the multiple pieces of digital content. In focalized interface 690, the common subject matter (e.g., trending topic, a user preference, a menu setting, search input, etc.) includes an actor featured in each piece of digital content that may have been a supporting actor and the secondary image can be retrieved from a supplemental database. In an example implementation, a menu that describes different pieces of content can be configured to select locate the different pieces of digital content based on a selected preferred secondary image for a first piece of digital content, and describe the different pieced of digital content with a secondary images for each piece of digital content based on a preferred secondary image for the first piece of digital content. For example, a first piece of digital content can show a preferred secondary image of an actor (e.g., a label) and a command (e.g., show me more) can find other pieces of digital content that include a secondary image or metadata corresponding to the label (e.g., actor). The menu of other pieces of digital content can include a secondary image to describe each piece of digital content that matches the actor of the first piece of digital content. Thus, the menu presents a theme of different digital content that are described by secondary images with a common object, label, person, team, etc.

FIGS. 7A-F illustrate example individualized interfaces in accordance with example implementations. Individualized interfaces in FIGS. 7A-F illustrate different secondary images 723A-723F selected as part of an individualized interface based on user information. FIGS. 7A-F include a content navigation menu 740A-F describing seven different pieces of content. In each content navigation menu 740A-F, the secondary image 723 is selected based on the user information. For example, content navigation menu 740A includes a secondary image 723A selected based on user information of a first user. Content navigation menu 740B includes a secondary image 723B selected based on user information of a second user. The different secondary images 723A-F are sub-images of a primary image (e.g., common show art image 411 of FIG. 4) that each describe the same piece of digital content (e.g., Marvel's Agents of S.H.I.E.L.D.). A different secondary image 723A-F can be selected for each user based on the user information of the user (e.g., viewing history, demographics, etc.). In this example, the content navigation menu 740A-F describe the other six different pieces of content using a common secondary image (e.g., a Lego man, Lincoln, a logo, etc.).

Figure 7A:
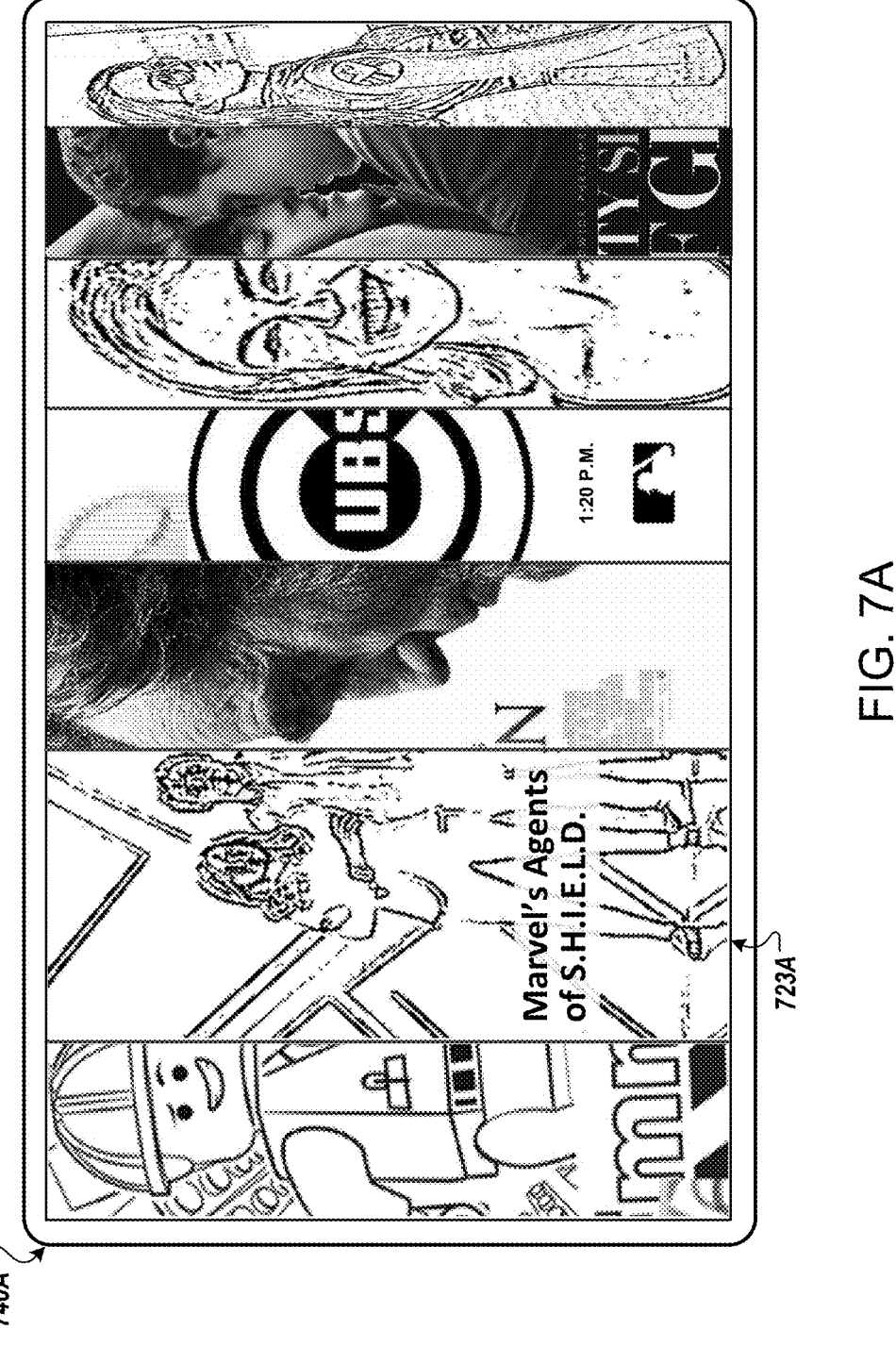
FIGS. 7A-F illustrate example individualized interfaces in accordance with example implementations.
Figure 7B:
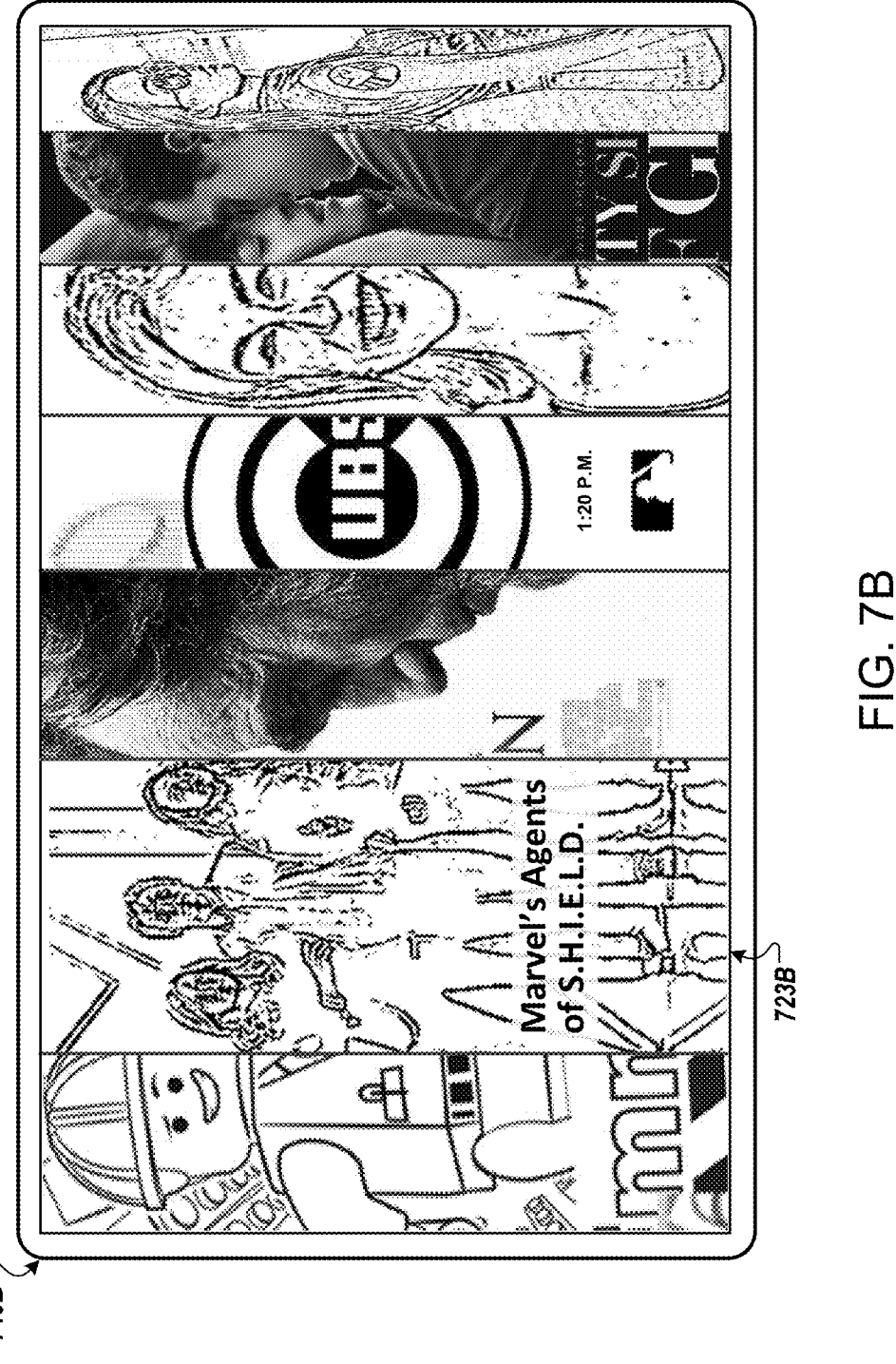
Figure 7C:
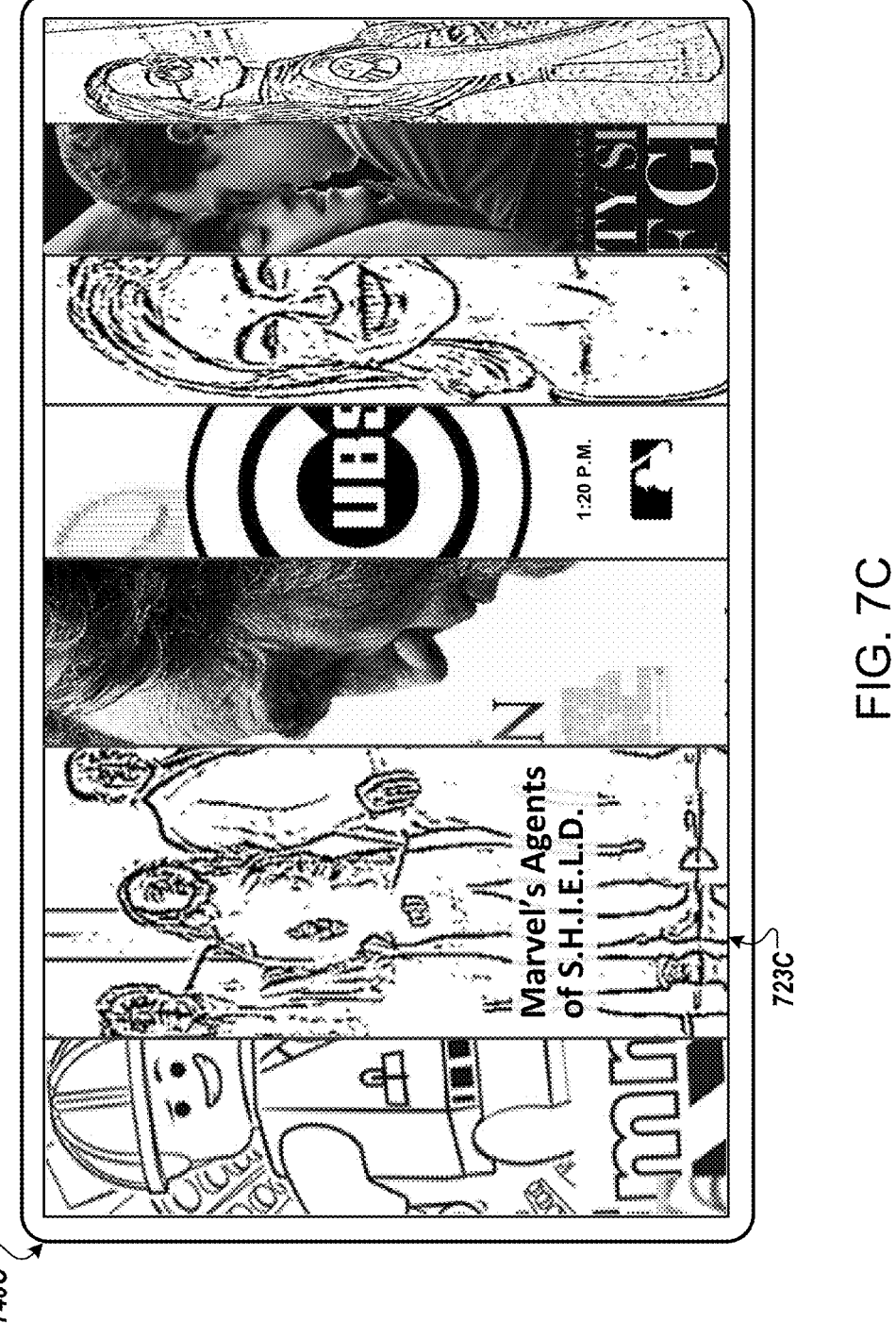
Figure 7D:
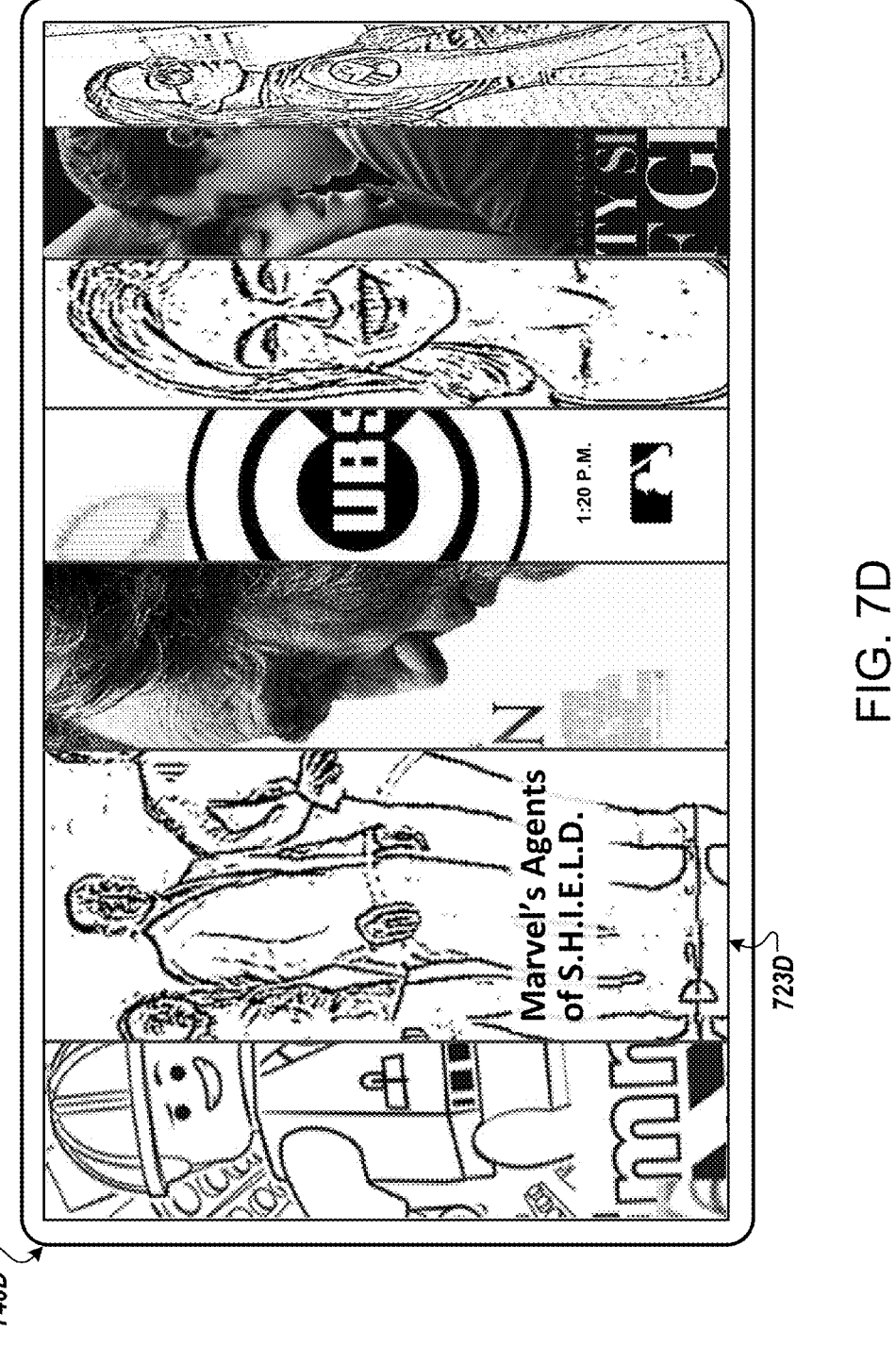
Figure 7E:
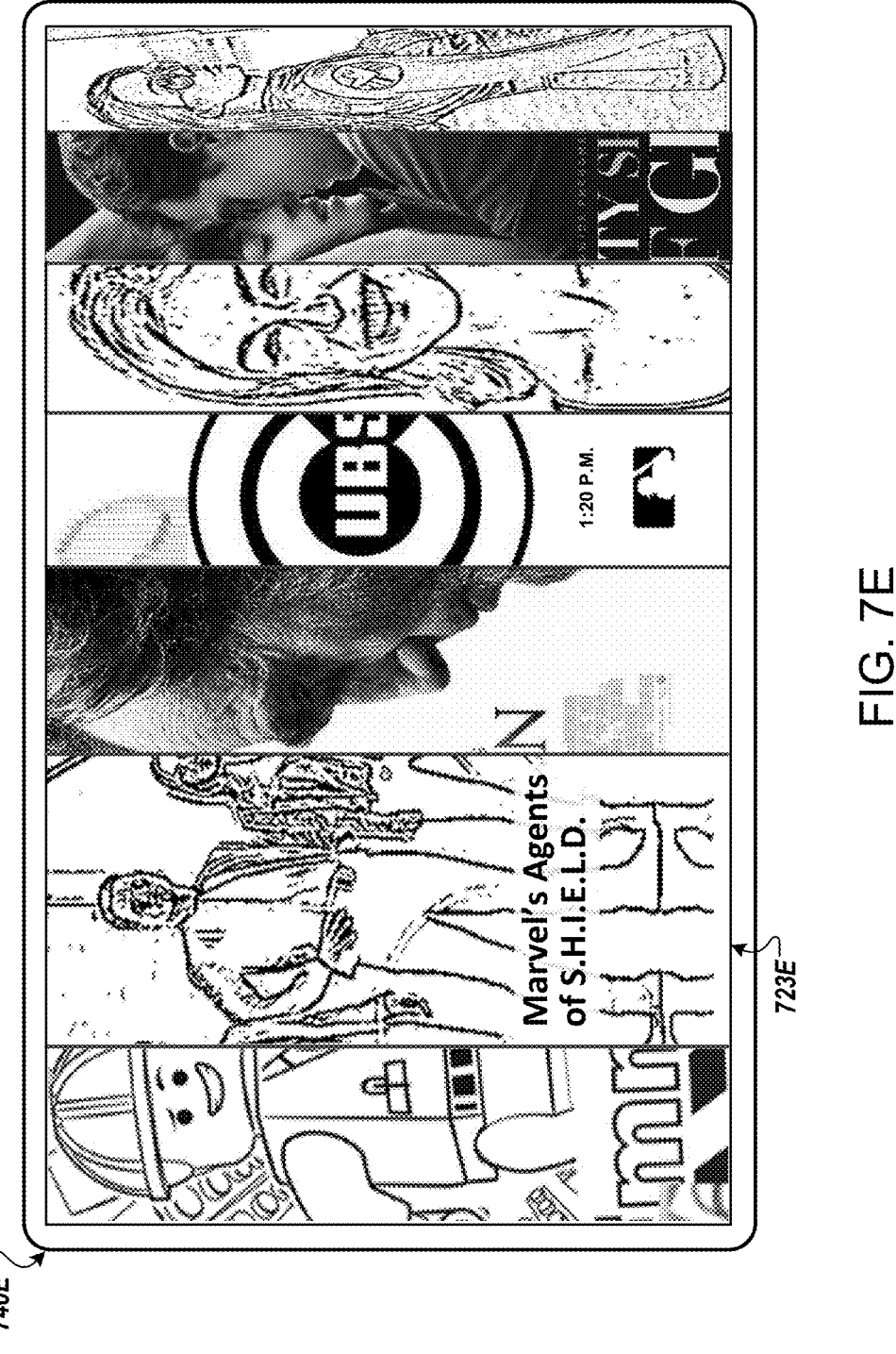
Figure 7F:
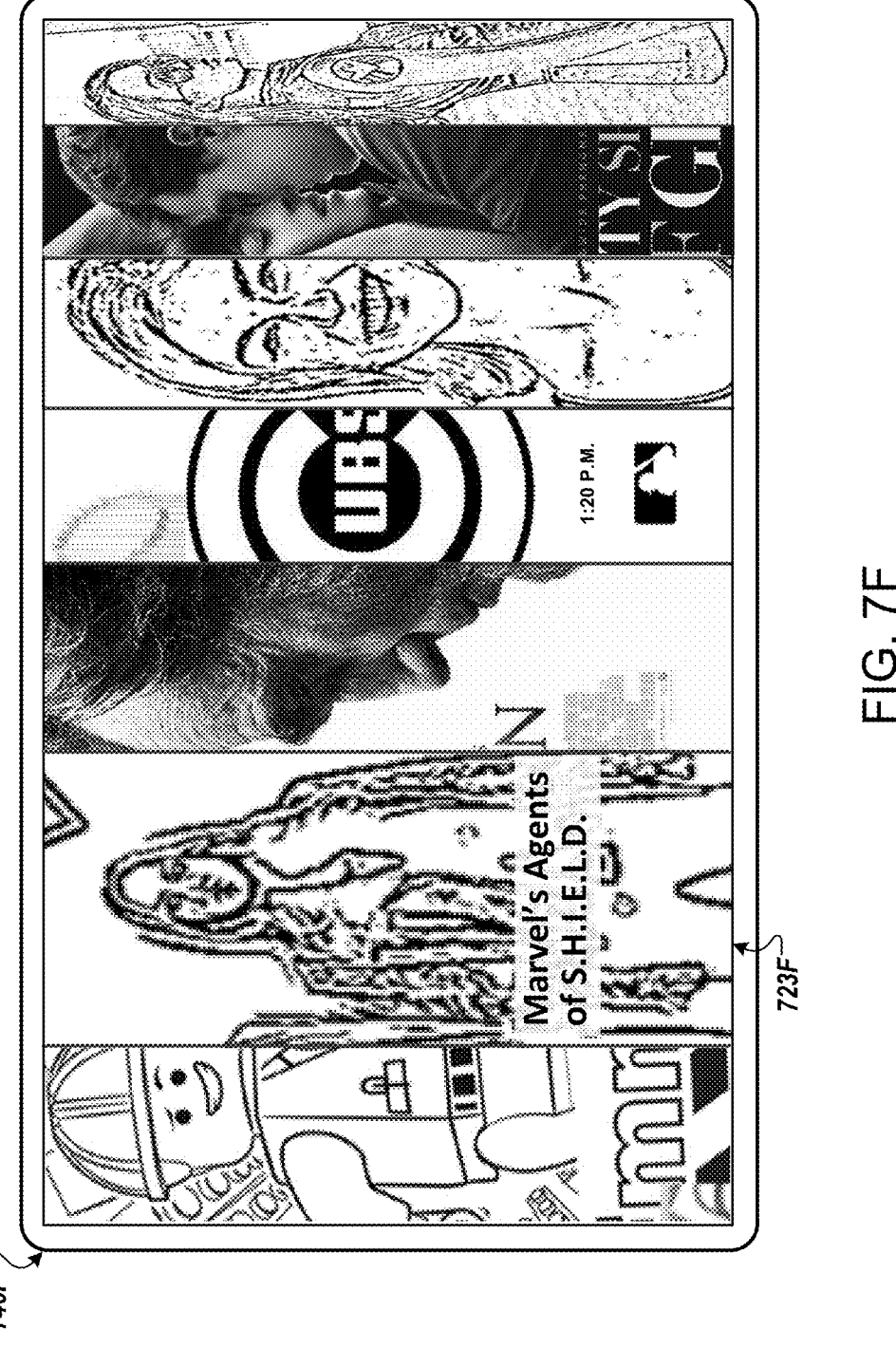

For example, FIG. 7A can be a content navigation menu where 723A describes a piece of digital content. FIGS. 7A-F can be interfaces for different users to navigate a collection of digital content. Each user can receive a different secondary images 623A-623E of the show art associated with a piece of digital content in response to a label of the one of the secondary images 623A-623E corresponding to user information for a viewer.

Figure 8A:
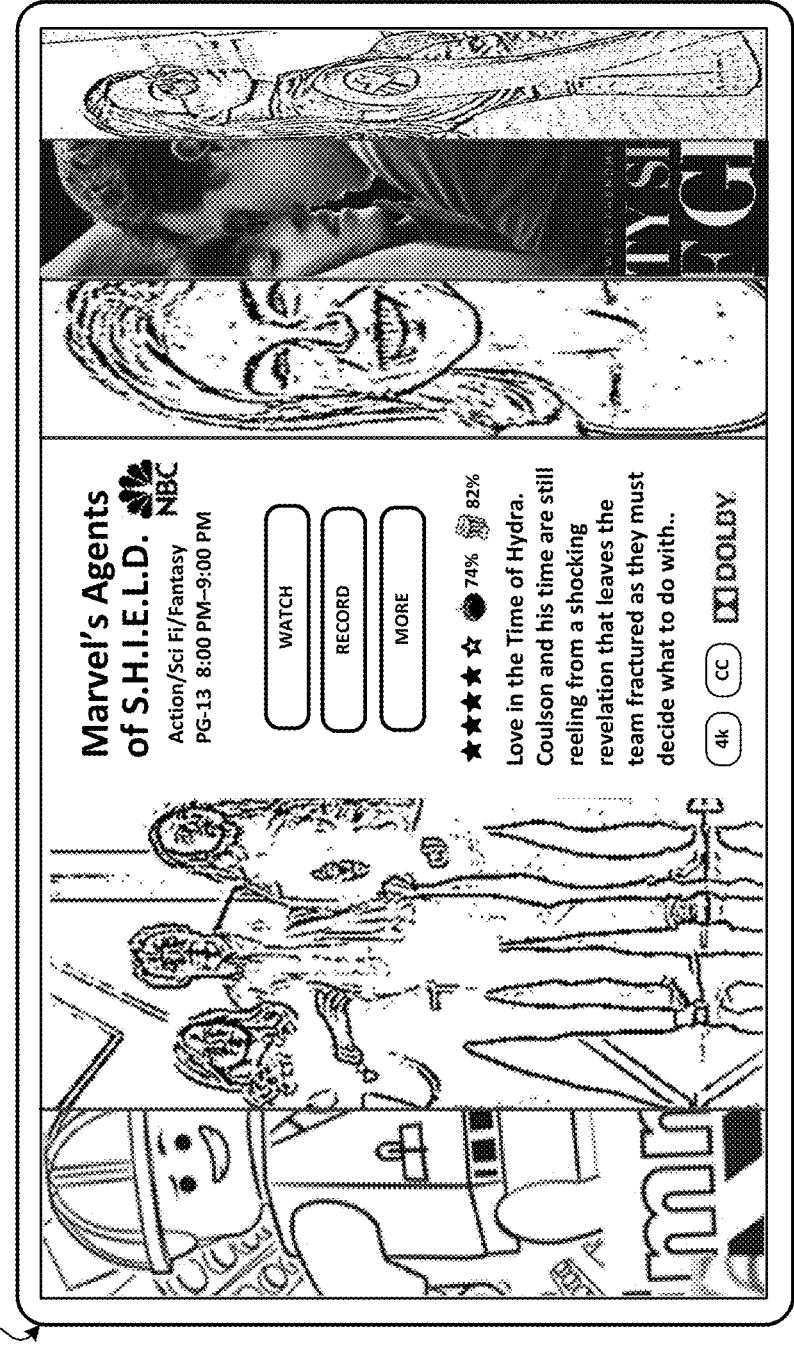
Figure 8B:
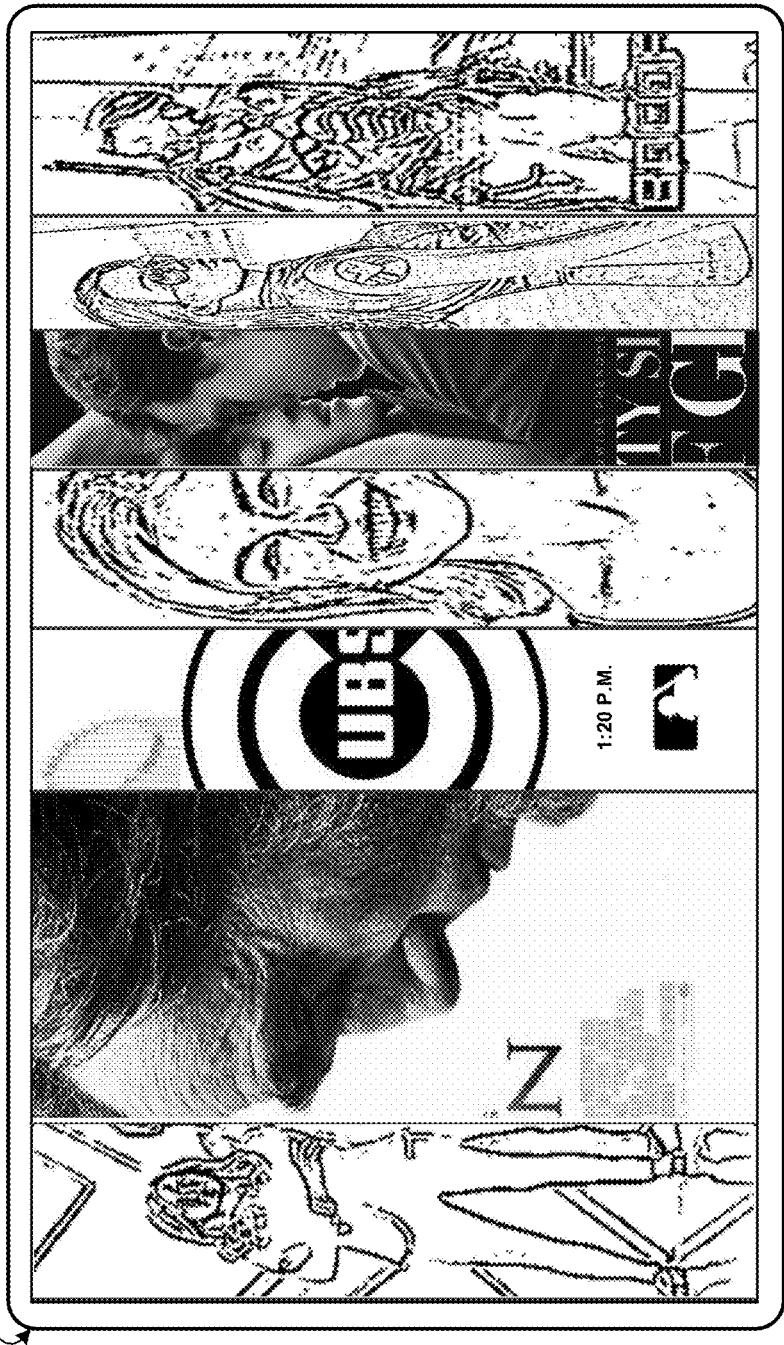

FIGS. 8A-C illustrate example interface control options in accordance with example implementations for control of an individualized interface. FIG. 8A illustrates an individualized interface 810 for content selection with an item detail menu with a secondary image. FIG. 8B illustrates an individualized interfaces 820 for a different piece of digital content using a secondary images for content selection. FIG. 8C depicts example content selection interfaces 830-860 using the focalization engine.

Figure 9:
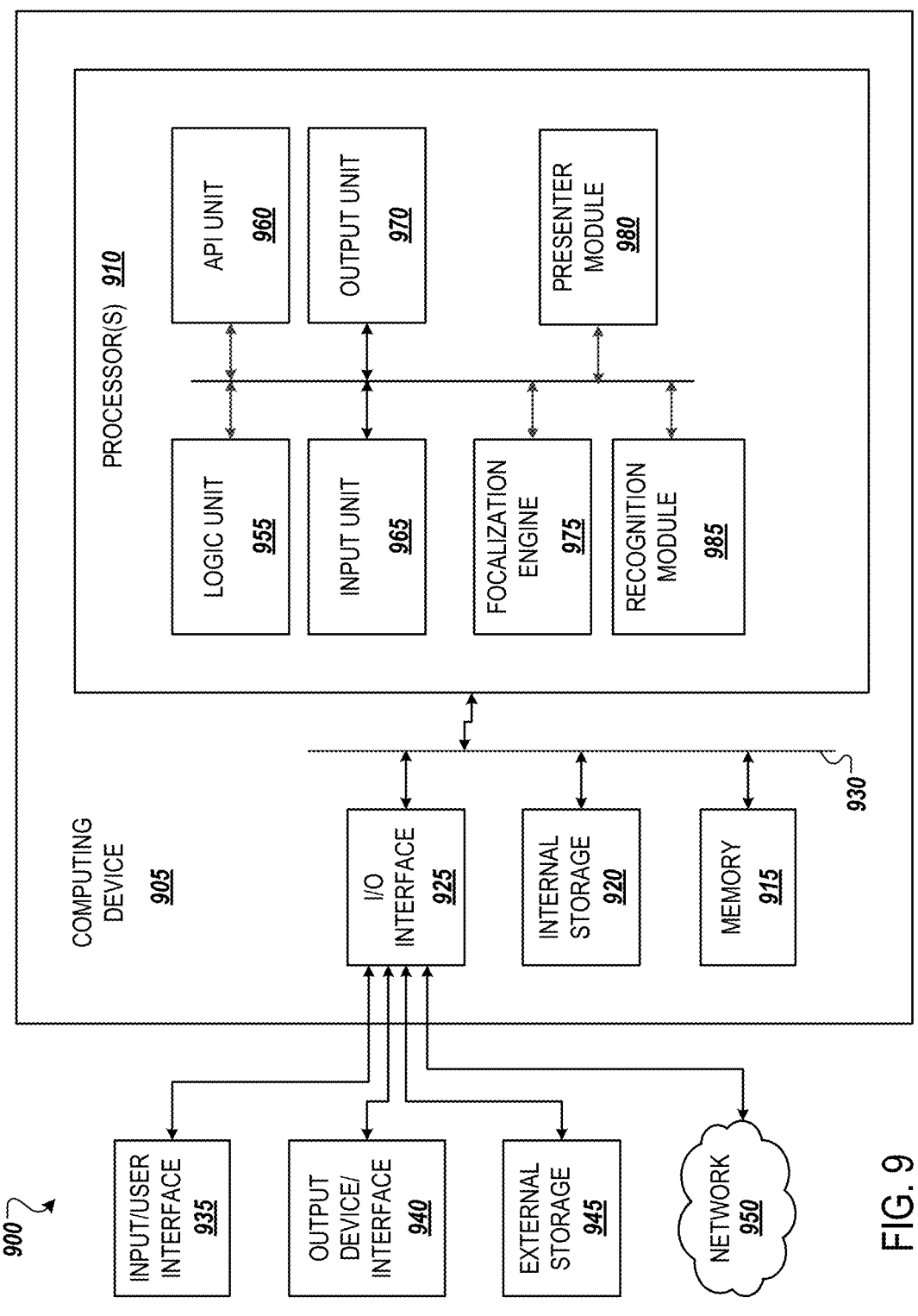
FIG. 9 illustrates an example server computing environment with an example computer device suitable for use in example implementations.

FIG. 9 illustrates an example server computing environment with an example computer device suitable for use in example implementations. Computing device 905 in computing environment 900 can include one or more processing units, cores, or processors 910, memory 915 (e.g., RAM, ROM, and/or the like), internal storage 920 (e.g., magnetic, optical, solid state storage, and/or organic), and/or I/O interface 925, any of which can be coupled on a communication mechanism or bus 930 for communicating information or embedded in the computing device 905.

The computing device 905 within which a set of instructions, for causing the machine to perform any one or more of the methodologies discussed herein, may be executed. In alternative implementations, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

Computing device 905 can be communicatively coupled to input/user interface 935 and output device/interface 940. Either one or both of input/user interface 935 and output device/interface 940 can be a wired or wireless interface and can be detachable. Input/user interface 935 may include any device, component, sensor, or interface, physical or virtual that can be used to provide input (e.g., buttons, touchscreen interface, keyboard, a pointing/cursor control, microphone, camera, braille, motion sensor, optical reader, and/or the like).

Output device/interface 940 may include a display, television, monitor, printer, speaker, braille, or the like. In some example implementations, input/user interface 935 and output device/interface 940 can be embedded with or physically coupled to the computing device 905. In other example implementations, other computing devices may function as or provide the functions of input/user interface 935 and output device/interface 940 for a computing device 905.

Examples of computing device 905 may include, but are not limited to, highly mobile devices (e.g., smartphones, devices in vehicles and other machines, devices carried by humans and animals, and the like), mobile devices (e.g., tablets, notebooks, set-top-box, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 905 can be communicatively coupled (e.g., via I/O interface 925) to external storage 945 and network 950 for communicating with any number of networked components, devices, and systems, including one or more computing devices of the same or different configuration. Computing device 905 or any connected computing device can be functioning as, providing services of, or referred to as a server, client, thin server, general machine, special-purpose machine, or another label.

The I/O interface 925 may include wireless communication components (not shown) that facilitate wireless communication over a voice and/or over a data network. The wireless communication components may include an antenna system with one or more antennae, a radio system, a baseband system, or any combination thereof. Radio frequency (RF) signals may be transmitted and received over the air by the antenna system under the management of the radio system.

I/O interface 925 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computing device 905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 910 can execute under any operating system (OS) (not shown), in a native or virtual environment. One or more applications can be deployed that include logic unit 955, application programming interface (API) unit 960, input unit 965, output unit 970, focalization engine 975, presenter module 980, and/or recognition module 985. For example, input unit 965, focalization engine 975, presenter module 980, and/or recognition module 985 may implement one or more processes shown in FIGS. 2-8. The described units and elements can be varied in design, function, configuration, or implementation and are not limited to the descriptions provided.

In some example implementations, when information or an execution instruction is received by API unit 960, it may be communicated to one or more other units (e.g., logic unit 955, output unit 970, input unit 965, focalization engine 975, presenter module 980, and/or recognition module 985).

Input unit 965 may, via API unit 960, receive images, metadata, video data, audio data, user information, etc. to manage points of interest, via focalization engine 975, presenter module 980, and/or recognition module 985. Using API unit 960, recognition module 985 can analyze the information to determining one or more points of interest in in digital content.

In some instances, logic unit 955 may be configured to control the information flow among the units and direct the services provided by API unit 960, input unit 965, output unit 970, focalization engine 975, presenter module 980, and/or recognition module 985 in some example implementations described above. For example, the flow of one or more processes or implementations may be controlled by logic unit 955 alone or in conjunction with API unit 960.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as "receiving," "detecting," "determining," "identifying," "analyzing," "generating," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium.

A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method operations. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application.

Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

The example implementations may have various differences and advantages over related art. For example, but not by way of limitation, as opposed to instrumenting web pages with JavaScript as explained above with respect to the related art, text and mouse (e.g., pointing) actions may be detected and analyzed in video documents.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method comprising:
   determining one or more points of interest in a digital content;
   determining a portion of the digital content associated with a point of interest of the one or more points of interest;
   determining a label for the portion of the digital content associated with the point of interest; and
   obtaining, based on the label and user information, supplemental content to replace at least the portion of the digital content, wherein the supplemental content is obtained from a source other than the digital content.

2. The method of claim 1, wherein the digital content includes an image.

3. The method of claim 2, wherein the one or more points of interest include one or more focal points within the image.

4. The method of claim 3, wherein the portion of the digital content associated with the point of interest includes a sub-image of the image.

5. The method of claim 4, wherein the supplemental content includes a supplemental image to replace the sub-image of the image.

6. The method of claim 1, wherein the digital content includes a video.

7. The method of claim 6, wherein the one or more points of interest include one or more frames of the video.

8. The method of claim 1, further comprising determining that the portion of the digital content associated with the point of interest is deficient for representing the digital content by determining that the portion of the digital content associated with the point of interest is obscured or is smaller than a particular size.

9. The method of claim 8, wherein the digital content includes an image, wherein the portion of the digital content associated with the point of interest includes a sub-image of the image, and wherein determining that the portion of the digital content associated with the point of interest is deficient for representing the digital content includes:

increasing a size of the sub-image; and determining that the sub-image is increased beyond a resolution threshold.

10. An apparatus comprising:

at least one processor; and memory accessible to the at least one processor, the memory storing instructions that, upon execution by the at least one processor, causes the at least one processor to perform operations to:

determine one or more points of interest in a digital content;

determine a portion of the digital content associated with a point of interest of the one or more points of interest;

determine a label for the portion of the digital content associated with the point of interest; and obtain, based on the label and user information, supplemental content to replace at least the portion of the digital content, wherein the supplemental content is obtained from a source other than the digital content.

11. The apparatus of claim 10, wherein the digital content includes an image.

12. The apparatus of claim 11, wherein the one or more points of interest include one or more focal points within the image.

13. The apparatus of claim 12, wherein the portion of the digital content associated with the point of interest includes a sub-image of the image.

14. The apparatus of claim 13, wherein the supplemental content includes a supplemental image to replace the sub-image of the image.

15. The apparatus of claim 10, wherein the digital content includes a video.

16. The apparatus of claim 15, wherein the one or more points of interest include one or more frames of the video.

17. The apparatus of claim 10, wherein the instructions, upon execution by the at least one processor, causes the at least one processor to perform operations to determine that the portion of the digital content associated with the point of interest is deficient for representing the digital content by determining that the portion of the digital content associated with the point of interest is obscured or is smaller than a particular size.

18. The apparatus of claim 17, wherein the digital content includes an image, wherein the portion of the digital content associated with the point of interest includes a sub-image of the image, and wherein, to determine that the portion of the digital content associated with the point of interest is deficient for representing the digital content, the instructions, upon execution by the at least one processor, causes the at least one processor to perform operations to:

increase a size of the sub-image; and determine that the sub-image is increased beyond a resolution threshold.

19. A non-transitory computer-readable storage medium having stored thereon instructions that, when executed by at least one processor, cause the at least one processor to:

determine one or more points of interest in a digital content;

determine a portion of the digital content associated with a point of interest of the one or more points of interest;

determining a label for the portion of the digital content associated with the point of interest; and obtain, based on the label and user information, supplemental content to replace at least the portion of the digital content, wherein the supplemental content is obtained from a source other than the digital content.

\* \* \* \* \*